US011265721B1

(12) United States Patent
Satpathy

(10) Patent No.: US 11,265,721 B1
(45) Date of Patent: Mar. 1, 2022

(54) SECURE DEVICE ATTESTATION AND MUTUAL AUTHENTICATION OF ARTIFICIAL REALITY DEVICES

(71) Applicant: Facebook Technologies, LLC, Menlo Park, CA (US)

(72) Inventor: Sudhir Satpathy, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 160 days.

(21) Appl. No.: 16/546,175

(22) Filed: Aug. 20, 2019

(51) Int. Cl.
*H04W 12/50* (2021.01)
*G06T 19/00* (2011.01)
*G02B 27/01* (2006.01)
*G06K 9/00* (2006.01)
*H04L 9/32* (2006.01)
*H04W 12/069* (2021.01)

(52) U.S. Cl.
CPC ........ *H04W 12/50* (2021.01); *G02B 27/0172* (2013.01); *G06K 9/00671* (2013.01); *G06T 19/006* (2013.01); *H04L 9/3263* (2013.01); *H04W 12/069* (2021.01)

(58) Field of Classification Search
CPC ... H04W 12/50; H04W 12/069; H04W 12/37; H04W 12/55; G06K 9/00671; H04L 9/3263; G06T 19/006; G02B 27/0172
See application file for complete search history.

(56) References Cited

U.S. PATENT DOCUMENTS

2018/0336332 A1\* 11/2018 Singh ............... H04W 12/50
2019/0020647 A1\* 1/2019 Sinha ................ G06F 21/33

\* cited by examiner

*Primary Examiner* — Jeffery A Brier
(74) *Attorney, Agent, or Firm* — Shumaker & Sieffert, P.A.

(57) ABSTRACT

The disclosure describes artificial reality (AR) systems and techniques that enable secure, privacy-preserving device attestation and mutual authentication of multiple devices used concurrently within a multi-device AR system. For example, an AR system comprises a security server configured to generate a pairing certificate that includes information identifying a plurality of devices to be operationally paired with each other. The AR system comprises a peripheral device configured to receive one or more inputs from a user of the AR system, wherein the peripheral device is configured to store the pairing certificate in a non-volatile memory (NVM) of the peripheral device for authenticating the peripheral device and a head-mounted display (HMD) for pairing. The AR system comprises the HMD configured to output artificial reality content, wherein the HMD is configured to store the pairing certificate in a NVM of the HMD for authenticating the HMD device and the peripheral device for pairing.

20 Claims, 11 Drawing Sheets

SECURE DEVICE ATTESTATION AND MUTUAL AUTHENTICATION OF ARTIFICIAL REALITY DEVICES

TECHNICAL FIELD

The disclosure generally relates to artificial reality systems, such as augmented reality, mixed reality, and/or virtual reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality, an augmented reality, a mixed reality, a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may entirely comprise content that is generated by the system or may include generated content combined with captured content (e.g., real-world video and/or images). During operation, the user typically interacts with the artificial reality system to select content, launch applications, configure the system and, in general, experience artificial reality environments.

SUMMARY

In general, the disclosure describes artificial reality (AR) systems and techniques that enable secure, privacy-preserving device attestation and mutual authentication of multiple devices used concurrently within a multi-device AR system. An example multi-device AR system includes a system in which a peripheral device operates as a co-processing AR device when paired with one or more head-mounted displays (HMDs). For example, as further described herein, the peripheral device and each HMD may each include one or more System on a Chip (SoC) integrated circuits (referred to herein as "SoCs" or "SoC integrated circuits") that are collectively configured to provide an artificial reality application execution environment. As described, the system and techniques herein enable each SoCs of the multiple devices to maintain attestation to a security server yet maintain security and privacy for each of the SoCs from each other even in asymmetric communication architectures where one or more of the SoCs communicate with the security server through one or more of the other SoCs.

In one example implementation, a security server generates a special form of a device-specific digital certificate, referred to as a pairing certificate that includes information specifying the particular devices permitted for pairing. In particular, the security server may generate a pairing certificate to include and precisely specify one or more identifiers (e.g., device certificates) of SoCs included in each device that can be paired in the AR environment. The security server may generate the pairing certificate based on policies that control the permitted relationship between the devices (e.g., whether the peripheral device is only permitted to have a one-to-one pairing relationship to an HMD or is permitted to have a one-to-many HMD pairing relationship). In some examples, the security server maintains a directory of pairing certificates and, prior to generating a new pairing certificate, confirms the requesting peripheral device is not already paired with one or more HMDs such that the requested new pairing would violate the policies.

Once the digital pairing certificate has been generated, each of the devices receives the pairing certificate, and in some examples in encrypted form, and stores the pairing certificate in an internal or external non-volatile memory (NVM). In some examples, each of the devices may include a designated SoC operating as a gatekeeper that has writable access to the NVM for storing the pairing certificate in the NVM. Advantageously, the gatekeeper SoC and/or a secure boot processor within a given device uses the pairing certificate to authenticate the SoCs within that device and to perform mutual authentication of the SoCs of other devices in the AR system. This provides an adaptive system that provides security and yet allows for changes to the paired devices. For example, when one or more HMDs are to be added or removed from the pairing with the peripheral device, the security server may generate an updated pairing certificate and each device may easily update its NVM with the updated pairing certificate.

As an additional aspect, the AR system and techniques use communication mechanisms that apply double encryption of SoC device certificates from any of the HMDs ("HMD device certificates"). This allows any HMD device to securely communicate the HMD device certificates to the security server by way of an intermediate peripheral device yet remain protected even in the event the peripheral device is compromised. For example, an HMD may double encrypt HMD device certificates using a server public key and a secret symmetric key that is negotiated between the peripheral device and the HMD, and sends the encrypted HMD device certificates toward the security server via the peripheral device. By additionally encrypting the HMD device certificates with the server public key, the peripheral device is only exposed to the encrypted HMD device certificates and therefore prevents device identification leakage to the peripheral device prior to authentication.

The techniques may provide one or more technical improvements that provide a practical application. For example, by storing a pairing certificate in each of the devices to be paired, each of the devices maintain attestation to a security server irrespective of connectivity to the security server. In this way, HMDs that are paired with the peripheral device can maintain attestation without depending and trusting the peripheral device for connectivity to the security server. In addition, by storing a pairing certificate in non-volatile memory, the pairing certificate is easily updated in the event a prior pairing certificate is compromised or to re-certify a new set of paired devices. The system and techniques described in this disclosure also prevent various attacks. For example, storing an encrypted pairing certificate in NVM prevents replay attacks in which an attacker replays data from the NVM in a forged device. Further, if mutual authentication fails, a new device attestation is triggered by communicating with the security server and receiving new pairing certificates, thereby preventing denial of service (DoS) attacks with NVM tampering. Moreover, by double encrypting the HMD device certificates, spoofing attacks are prevented because a compromised device (e.g., a peripheral device) cannot be used to gather device identifiers and certificates of other devices. The system and techniques described in this disclosure also prevent remote attacks because real-time clocks keep track of a delay and enforce authentication re-start if one or more HMD handshakes do not complete within a set time. This ensures proximity check between the HMD and peripheral device. In some examples, the system and techniques may use nonce hashing-based handshaking to guarantee that peripheral device and HMDs commit NVM writes only after authentication success, thereby preventing Malicious NVM write attacks. In this way, NVM write cycles cannot be misused with malicious abandoned pairings.

In one or more example aspects, an artificial reality system includes a security server configured to generate a pairing certificate that includes information identifying a plurality of devices to be operationally paired with each other within the artificial reality system. The artificial reality system also includes a peripheral device of the plurality of devices configured to receive one or more inputs from a user of the artificial reality system, wherein the peripheral device is configured to store the pairing certificate in a non-volatile memory of the peripheral device for authenticating the peripheral device and a head-mounted display (HMD) of the plurality of devices for pairing. The artificial reality system further includes the HMD configured to output artificial reality content, wherein the HMD is configured to store the pairing certificate in a non-volatile memory of the HMD for authenticating the HMD device and the peripheral device for pairing.

In one or more additional example aspects, a method includes receiving, by a device of a plurality of devices of an artificial reality system, a pairing certificate that includes information specifying the device and one or more other devices of the plurality of devices, wherein the plurality of devices comprises a peripheral device configured to receive one or more inputs from a user of the artificial reality system and a head-mounted display (HMD) configured to output artificial reality content. The method also includes storing, by the device, the pairing certificate in a non-volatile memory of the device. The method further includes authenticating, by the device and based on the pairing certificate, one or more other devices of the plurality of devices for operationally pairing with the device.

In one or more additional example aspects, a non-transitory, computer-readable medium includes instructions that, when executed, cause one or more processors of an artificial reality system, including a head-mounted display (HMD) configured to output artificial reality content and a peripheral device configured to receive one or more inputs from a user of the artificial reality system, to receive a device attestation request for pairing the peripheral device with the HMD; generate a pairing certificate that includes information specifying the peripheral device and the HMD to be paired; and send the pairing certificate toward the peripheral device and the HMD for storage in a non-volatile memory of the peripheral device and a non-volatile memory of the HMD.

The details of one or more examples are set forth in the accompanying drawings and the description below. Other features, objects, and advantages will be apparent from the description and drawings, and from the claims.

DETAILED DESCRIPTION

Figure 1A:
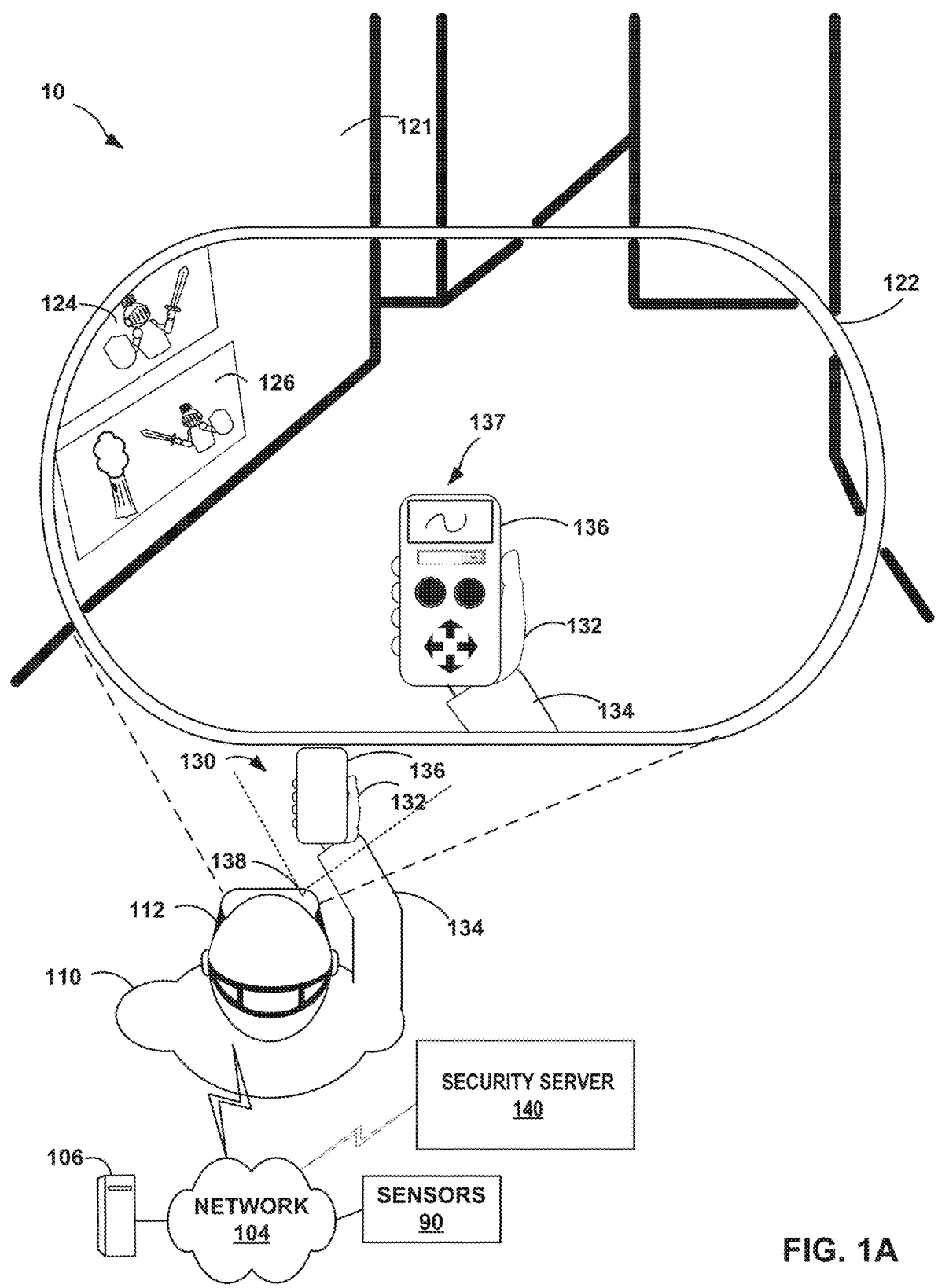
FIG. 1A is an illustration depicting an example multi-device artificial reality system that enables secure, privacy-preserving device attestation and mutual authentication of multiple devices, in accordance with the techniques described in this disclosure.

FIG. 1A is an illustration depicting an example multi-device artificial reality system that enables secure, privacy-preserving device attestation and mutual authentication of multiple devices, in accordance with the techniques described in this disclosure. In the example of FIG. 1A, artificial reality system 10 includes HMD 112, peripheral device 136, and may in some examples include one or more external sensors 90 and/or console 106.

As shown, HMD 112 is typically worn by user 110 and comprises an electronic display and optical assembly for presenting artificial reality content 122 to user 110. In addition, HMD 112 includes one or more sensors (e.g., accelerometers) for tracking motion of the HMD 112 and may include one or more image capture devices 138 (e.g., cameras, line scanners) for capturing image data of the surrounding physical environment. Although illustrated as a head-mounted display, AR system 10 may alternatively, or additionally, include glasses or other display devices for presenting artificial reality content 122 to user 110.

In this example, console 106 is shown as a single computing device, such as a gaming console, workstation, a desktop computer, or a laptop. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, 3D physical environment to render artificial reality content 122 for display to user 110. In the example of FIG. 1A, a user 110 views the artificial reality content 122 constructed and rendered by an artificial reality application executing on HMD 112 and/or console 106. In some examples, artificial reality content 122 may comprise a mixture of real-world imagery (e.g., hand 132, peripheral device 136, walls 121) and virtual objects (e.g., virtual content items 124, 126 and virtual user interface 137) to produce mixed reality and/or augmented reality. In some examples, virtual content items 124, 126 may be mapped (e.g., pinned, locked, placed) to a particular position within artificial reality content 122. A position for a virtual content item may be fixed, as relative to one of wall 121 or the earth, for instance. A position for a virtual content item may be variable, as relative to peripheral device 136 or a user, for instance. In some examples, the particular position of a virtual content item within artificial reality content 122 is associated with a position within the real-world, physical environment (e.g., on a surface of a physical object).

In this example, peripheral device 136 is a physical, real-world device having a surface on which AR system 10 overlays virtual user interface 137. Peripheral device 136 may include one or more presence-sensitive surfaces for detecting user inputs by detecting a presence of one or more objects (e.g., fingers, stylus) touching or hovering over locations of the presence-sensitive surface. In some examples, peripheral device 136 may include an output display, which may be a presence-sensitive display. In some examples, peripheral device 136 may be a smartphone, tablet computer, personal data assistant (PDA), or other hand-held device. In some examples, peripheral device 136 may be a smartwatch, smartring, or other wearable device. Peripheral device 136 may also be part of a kiosk or other stationary or mobile system. Peripheral device 136 may or may not include a display device for outputting content to a screen.

In the example artificial reality experience shown in FIG. 1A, virtual content items 124, 126 are mapped to positions on wall 121. The example in FIG. 1A also shows that virtual content item 124 partially appears on wall 121 only within artificial reality content 122, illustrating that this virtual content does not exist in the real world, physical environment. Virtual user interface 137 is mapped to a surface of peripheral device 136. As a result, AR system 10 renders, at a user interface position that is locked relative to a position of peripheral device 136 in the artificial reality environment, virtual user interface 137 for display at HMD 112 as part of artificial reality content 122. FIG. 1A shows that virtual user interface 137 appears on peripheral device 136 only within artificial reality content 122, illustrating that this virtual content does not exist in the real-world, physical environment.

The artificial reality system 10 may render one or more virtual content items in response to a determination that at least a portion of the location of virtual content items is in the field of view 130 of user 110. For example, artificial reality system 10 may render a virtual user interface 137 on peripheral device 136 only if peripheral device 136 is within field of view 130 of user 110.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 10 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. As illustrated in FIG. 1A, the artificial reality application may render images of real-world objects, such as the portions of peripheral device 136, hand 132, and/or arm 134 of user 110, that are within field of view 130 along the virtual objects, such as within artificial reality content 122. In other examples, the artificial reality application may render virtual representations of the portions of peripheral device 136, hand 132, and/or arm 134 of user 110 that are within field of view 130 (e.g., render real-world objects as virtual objects) within artificial reality content 122. In either example, user 110 is able to view the portions of their hand 132, arm 134, peripheral device 136 and/or any other real-world objects that are within field of view 130 within artificial reality content 122. In other examples, the artificial reality application may not render representations of the hand 132 or arm 134 of the user.

During operation, artificial reality system 10 performs object recognition within image data captured by image capture devices 138 of HMD 112 to identify peripheral device 136, hand 132, including optionally identifying individual fingers or the thumb, and/or all or portions of arm 134 of user 110. Further, artificial reality system 10 tracks the position, orientation, and configuration of peripheral device 136, hand 132 (optionally including particular digits of the hand), and/or portions of arm 134 over a sliding window of time. In some examples, peripheral device 136 includes one or more sensors (e.g., accelerometers) for tracking motion or orientation of the peripheral device 136.

As described above, multiple devices of artificial reality system 10 may work in conjunction in the AR environment, where each device may be a separate physical electronic device and/or separate integrated circuits (e.g., System on a Chip (SOC)) within one or more physical devices. In this example, peripheral device 136 is operationally paired with HMD 112 to jointly operate within AR system 10 to provide an artificial reality experience. For example, peripheral device 136 and HMD 112 may communicate with each other as co-processing devices. As one example, when a user performs a user interface gesture in the virtual environment at a location that corresponds to one of the virtual user interface elements of virtual user interface 137 overlaid on the peripheral device 136, the AR system 10 detects the user interface and performs an action that is rendered to HMD 112.

In accordance with the techniques of this disclosure, artificial reality system 10 may provide secure device attestation and mutual authentication of multiple devices used in conjunction within the AR environment, such as peripheral device 136 operated as a co-processing AR device when operationally paired with one or more HMDs, e.g., HMD 112. Although the techniques described herein are described with respect to securing device attestation and mutual authentication of a peripheral device 136 and one or more HMDs, the techniques may apply to any devices that may be paired in AR system 10.

In some example implementations, as described herein, peripheral device 136 and HMD 112 may each include one or more System on a Chip (SoC) integrated circuits configured to support an artificial reality application, such as SoCs operating as co-application processors, sensor aggregators, display controllers, etc. When peripheral device 136 and HMD 112 are powered on, peripheral device 136 and HMD 112 may request for attestation of SoCs at the time of first pairing. That is, each SoC within each of peripheral device 136 and HMD 112 may require that each other SoCs be identified and trusted by security server 140. For example, peripheral device 136 and HMD 112 may each send to security server 140 information of one or more SoCs to be attested. As examples, peripheral device 136 and HMD 112 may each send to security server 140 device certificates that include SoC specific information, such as an identifier, serial number, expiry, etc., for security server 140 to identify particular SoCs to be attested.

In some examples, only the peripheral device 136 may have communication with security server 140. In these examples, artificial reality system 10 may also provide secure communication mechanisms to prevent leakage of device information of HMD 112 and peripheral device 136 in the event that either of the devices is compromised. For example, and as further described below, HMD 112 may apply double encryption of to a device certificate before sending the device certificate to security server 140 via peripheral device 136. HMD 112 may encrypt the device certificate to securely communicate the device certificate to security server 140 as it passes through the peripheral device 136. HMD 112 further encrypt the device certificate to securely communicate the device certificate to peripheral device 136. In this way, peripheral device 136 is only exposed to encrypted device certificates of HMD 112 when sending the device certificates of HMD 112 to security server 140. This allows HMD 112 to securely communicate the device certificates of HMD 112 to security server 140 by way of an intermediate peripheral device, e.g., peripheral device 136, yet remain protected even in the event peripheral device 136 is compromised.

When security server 140 receives (on initial pairing or a change in pairing) the device certificates for the SoCs of peripheral device 136 and HMD 112 to be paired, security server 140 verifies the device certificates, and if verified, generates a special form of a device-specific digital certificate, referred to herein as a pairing certificate that includes information specifying that the particular devices have been approved for pairing. In one example, security server 140 may generate the pairing certificate to include and precisely specify each of the device certificates of the SoCs within peripheral device 136 and HMD 112 that are permitted for pairing so as to form a multi-device AR system.

In some examples, security server 140 may generate a pairing certificate based on one or more policies that control permitted pairing relationships between devices. The policies may define a permitted pairing relationship as, for example, a one-to-one pairing relationship, a one-to-many pairing relationship, many-to-one pairing relationship, or a many-to-many pairing relationship, and such relationships may be based on a variety of factors, such as user profiles, purchased levels of service, and the like. For example, security server 140 may determine, based on the policies, that peripheral device 136 is only permitted with a one-to-one pairing relationship with an HMD. In this example, security server 140 generates a pairing certificate only when peripheral device 136 is requested to be paired with a single HMD 112 and has not already been paired with a different HMD. Alternatively, if peripheral device 136 is requesting to pair with multiple HMDs, security server 140 may not generate a pairing certificate because peripheral device 136 is only permitted with a one-to-one pairing relationship.

In some examples, security server 140 maintains a directory (e.g., repository or database) of pairing certificates and, prior to generating a new pairing certificate, confirms that the new pairing would not violate the policies. For example, peripheral device 136 may have an existing one-to-one pairing relationship with another HMD. In the event security server 140 receives a request to pair peripheral device 136 with HMD 112, security server 140 may refer to the directory of pairing certificates and determine that peripheral device 136 is already paired with another HMD. In response, security server 140 may not generate a new pairing certificate because the new pairing would violate the existing one-to-one pairing relationship.

Once the device certificates have been verified and the pairing certificate has been generated, security server 140 sends the pairing certificate to peripheral device 136, which in turn sends the pairing certificate to HMD 112. In some examples, security server 140 encrypts the pairing certificate before sending the pairing certificate to the devices. Each of peripheral device 136 and HMD 112 receives the pairing certificate and stores the pairing certificate in an internal or external non-volatile memory (NVM). In some examples, the pairing certificate is encrypted with a public key or symmetric key prior to storing the pairing certificate in the NVM. Storing the pairing certificate in the NVM enables peripheral device 136 and HMD 112 to each maintain attestation irrespective of connectivity to security server 140. For example, unlike an asymmetric architecture in which only a peripheral device maintains connectivity with the security server (and therefore requiring the HMD to trust the peripheral device for connecting to the security server), each of peripheral device 136 and HMD 112 store a pairing certificate in NVM such that subsequent pairings between a previously attested peripheral device 136 and HMD 112 can occur without connectivity to security server 140. That is, when the peripheral device 136 and HMD 112 are powered on and performs a secure boot, each of the devices may mutually authenticate the SoCs of the devices based on the pairing certificate stored in the NVM of each device. For example, a security processor of peripheral device 136 may have exclusive access to the pairing certificate stored in the NVM and use the pairing certificate to determine whether the pairing certificate specifies device certificates of SoCs of peripheral device 136 and HMD 112. Similarly, a security processor of HMD 112 may use the pairing certificate stored in the NVM of HMD 112 and checks for whether the pairing certificate specifies device certificates of SoCs of HMD 112 and peripheral device 136.

Figure 1B:
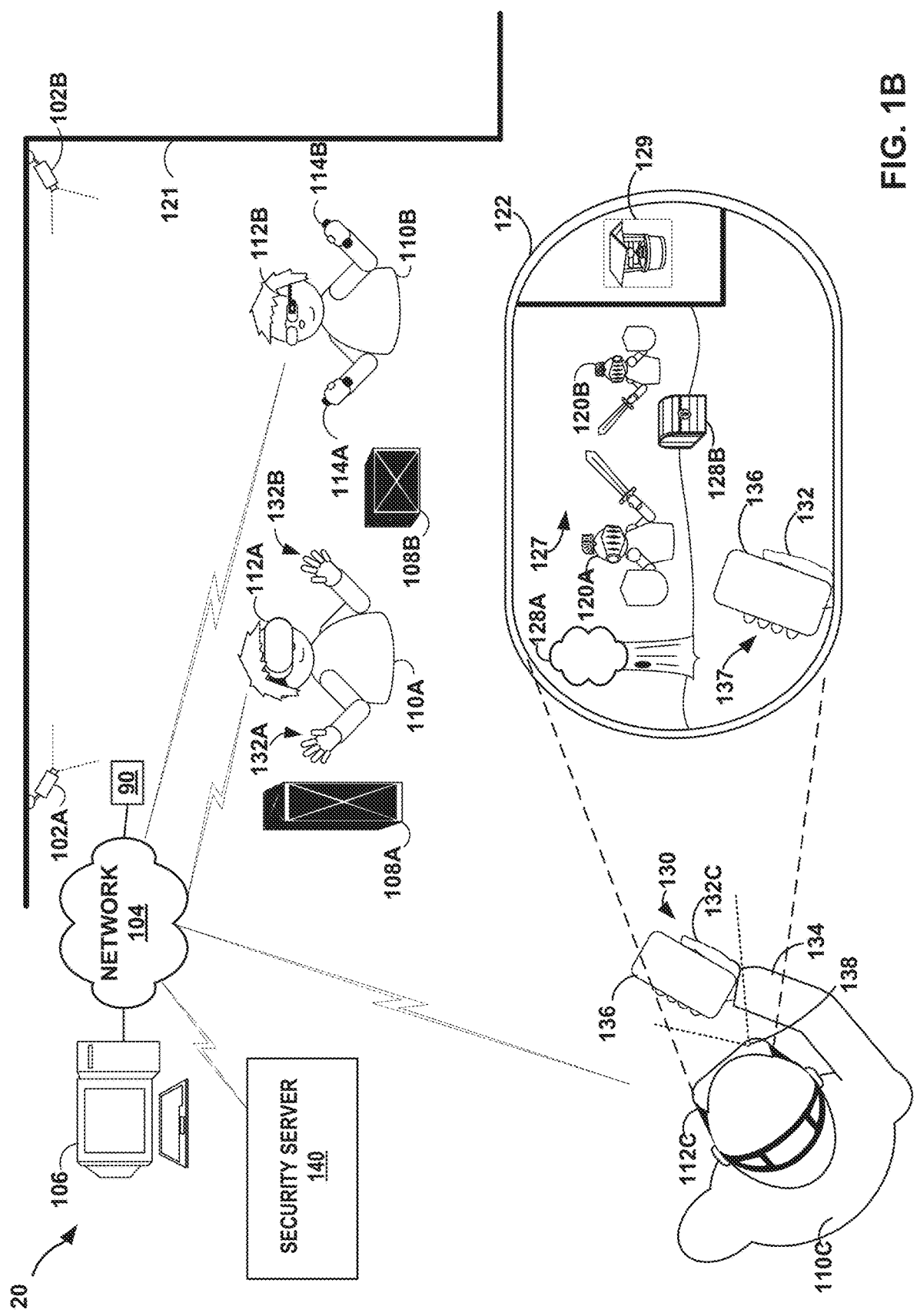
FIG. 1B is an illustration depicting an example artificial reality system that enables secure, privacy-preserving device attestation and mutual authentication of multiple devices, in accordance with techniques described in this disclosure.

FIG. 1B is an illustration depicting another example artificial reality system 20 that enables secure, privacy-preserving device attestation and mutual authentication of multiple devices in accordance with the techniques described in this disclosure. Similar to artificial reality system 10 of FIG. 1A, in some examples, artificial reality system 20 of FIG. 1B may generate and render virtual content items with respect to a virtual surface within a multi-user artificial reality environment. Artificial reality system 20 may also, in various examples, generate and render certain virtual content items and/or graphical user interface elements to a user in response to detection of one or more particular interactions with peripheral device 136 by the user. For example, the peripheral device 136 may act as a stage device for the user to "stage" or otherwise interact with a virtual surface.

In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), console 106, and sensors 90. As shown in FIG. 1B, artificial reality system 20 represents a multi-user environment in which an artificial reality application executing on console 106 and/or HMDs 112 presents artificial reality content to each of users 110A-110C (collectively, "users 110") based on a current viewing perspective of a corresponding frame of reference for the respective user. That is, in this example, the artificial reality application constructs artificial content by tracking and computing pose information for a frame of reference for each of HMDs 112. Artificial reality system 20 uses data received from cameras 102, HMDs 112, and controllers 114 to capture 3D information within the real world environment, such as motion by users 110 and/or tracking information with respect to users 110 and objects 108, for use in computing updated pose information for a corresponding frame of reference of HMDs 112. As one example, the artificial reality application may render, based on a current viewing perspective determined for HMD 112C, artificial reality content 122 having virtual objects 128A-128B (collectively, "virtual objects 128") as spatially overlaid upon real world objects 108A-108B (collectively, "real world objects 108"). Further, from the perspective of HMD 112C, artificial reality system 20 renders avatars 120A, 120B based upon the estimated positions for users 110A, 110B, respectively.

Each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may operate substantially similar to HMD 112 of FIG. 1A by tracking hand 132 and/or arm 134 of user 110C and rendering the portions of hand 132 that are within field of view 130 as virtual hand 132 within artificial reality content 122. HMD 112B may receive user inputs from controllers 114 held by user 110B. In some examples, controller 114A and/or 114B can correspond to peripheral device 136 of FIG. 1A and operate substantially similar to peripheral device 136 of FIG. 1A. HMD 112A may also operate substantially similar to HMD 112 of FIG. 1A and receive user inputs in the form of gestures performed on or with peripheral device 136 by of hands 132A, 132B of user 110A. HMD 112B may receive user inputs from controllers 114 held by user 110B. Controllers 114 may be in communication with HMD 112B using near-field communication of short-range wireless communication such as Bluetooth, using wired communication links, or using other types of communication links.

In a manner similar to the examples discussed above with respect to FIG. 1A, console 106 and/or HMD 112C of artificial reality system 20 generates and renders a virtual surface comprising virtual content item 129 (e.g., GIF, photo, application, live-stream, video, text, web-browser, drawing, animation, 3D model, representation of data files (including two-dimensional and three-dimensional datasets), or any other visible media), which may be overlaid upon the artificial reality content 122 displayed to user 110C when the portion of wall 121 associated with virtual content item 129 comes within field of view 130 of HMD 112C. As shown in FIG. 1B, in addition to or alternatively to image data captured via camera 138 of HMD 112C, input data from external cameras 102 may be used to track and detect particular motions, configurations, positions, and/or orientations of peripheral device 136 and/or hands and arms of users 110, such as hand 132 of user 110C, including movements of individual and/or combinations of digits (fingers, thumb) of the hand.

In some aspects, the artificial reality application can run on console 106, and can utilize image capture devices 102A and 102B to analyze configurations, positions, and/or orientations of hand 132B to identify input gestures that may be performed by a user of HMD 112A. Similarly, HMD 112C can utilize image capture device 138 to analyze configurations, positions, and/or orientations of peripheral device 136 and hand 132C to input gestures that may be performed by a user of HMD 112C. In some examples, peripheral device 136 includes one or more sensors (e.g., accelerometers) for tracking motion or orientation of the peripheral device 136. The artificial reality application may render virtual content items and/or UI elements, responsive to such gestures, motions, and orientations, in a manner similar to that described above with respect to FIG. 1A.

Image capture devices 102 and 138 may capture images in the visible light spectrum, the infrared spectrum, or other spectrum. Image processing described herein for identifying objects, object poses, and gestures, for example, may include processing infrared images, visible light spectrum images, and so forth.

Devices of artificial reality system 20 may work in conjunction in the AR environment. For example, peripheral device 136 is paired with HMD 112C to jointly operate within AR system 20. Similarly, controllers 114 are paired with HMD 112B to jointly operate within AR system 20. Peripheral device 136, HMDs 112, and controllers 114 may each include one or more SoC integrated circuits configured to enable an operating environment for artificial reality applications. When devices are first powered on, the devices may request for attestation of SoCs at the time of first pairing. For example, peripheral device 136 may send to security server 140 a device attestation request including device certificates of SoCs of peripheral device 136 and HMD 112C. Similarly, in some examples, controllers 114 may send a device attestation request including device certificates of SoCs of controllers 114 and HMD 112B.

When security server 140 receives the device certificates and establishes pairing of the multiple devices, the security server verifies the device certificates, and if verified, generates a pairing certificate that includes information specifying the particular devices permitted for pairing. In this example, security server 140 may determine the permitted pairing relationship (e.g., one-to-one pairing relationship) of peripheral device 136 and HMD 112C. Similarly, security server 140 may determine the permitted pairing relationship of controller 114 and HMD 112C. In some examples, security server 140 maintains a directory of pairing certificates and determines from the pairing certificates stored in the directory whether generating a new pairing certificate would violate the one or more policies.

If verified, security server 140 may generate and send a pairing certificate that specifies devices permitted for pairing. For example, security server 140 may generate and send a pairing certificate that specifies device certificates of SoCs of peripheral device 136 and HMD 112C. Each of peripheral device 136 and HMD 112C receives the pairing certificate and stores the pairing certificate in an internal or external NVM. In some examples, the pairing certificate is encrypted with a public key or symmetric key prior to storing the pairing certificate in the NVM. When the peripheral device 136 and HMD 112C are powered on and perform a secure boot, each of the devices may mutually authenticate the SoCs of the devices based on the pairing certificate stored in the NVM of each device. Security server 140 may also generate and send a pairing certificate that specifies device certificates of SoCs of controllers 114 and HMD 112B. Each of controllers 114 and HMD 112B receives the pairing certificate and stores the pairing certificate in an internal or external NVM. When the controllers 114 and HMD 112B are powered on and perform a secure boot, each of the devices may mutually authenticate the SoCs of the devices based on the pairing certificate stored in the NVM of each device.

Figure 2A:
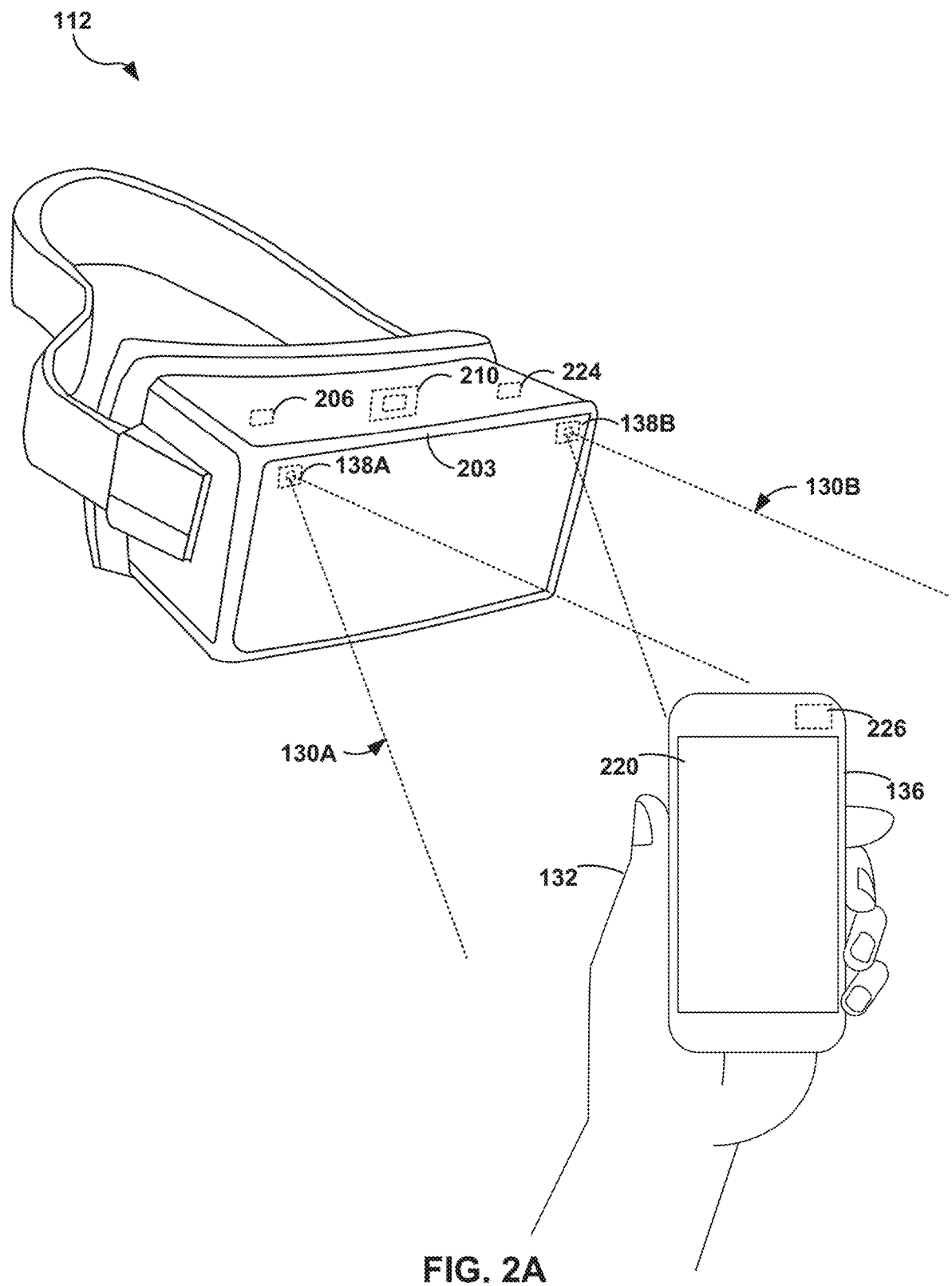
FIG. 2A is an illustration depicting an example HMD and an example peripheral device that enables secure, privacy-preserving device attestation and mutual authentication of multiple devices, in accordance with techniques described in this disclosure.

FIG. 2A is an illustration depicting an example HMD 112 and an example peripheral device 136 that provide secure, privacy-preserving device attestation and mutual authentication, in accordance with techniques described in this disclosure. HMD 112 of FIG. 2A may be an example of any of HMDs 112 of FIGS. 1A and 1B. HMD 112 may be part of an artificial reality system, such as artificial reality systems 10, 20 of FIG. 1A, 1B, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects (including peripheral device 136 and/or hand 132) in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In one example, control unit 210 is configured to, based on the sensed data (e.g., image data captured by image capture devices 138 and/or 102, position information from GPS sensors), generate and render for display on display 203 a virtual surface comprising one or more virtual content items (e.g., virtual content items 124, 126 of FIG. 1A) associated with a position contained within field of view 130A, 130B of image capture devices 138. As explained with reference to FIGS. 1A-1B, a virtual content item may be associated with a position within a virtual surface, which may be associated with a physical surface within a real-world environment, and control unit 210 can be configured to render the virtual content item (or portion thereof) for display on display 203 in response to a determination that the position associated with the virtual content (or portion therefore) is within the current field of view 130A, 130B. In some examples, a virtual surface is associated with a position on a planar or other surface (e.g., a wall), and control unit 210 will generate and render the portions of any virtual content items contained within that virtual surface when those portions are within field of view 130A, 130B.

In one example, control unit 210 is configured to, based on the sensed data, identify a specific gesture or combination of gestures performed by the user and, in response, perform an action. For example, in response to one identified gesture, control unit 210 may generate and render a specific user interface for display on electronic display 203 at a user interface position locked relative to a position of the peripheral device 136. For example, control unit 210 can generate and render a user interface including one or more UI elements (e.g., virtual buttons) on surface 220 of peripheral device 136 or in proximity to peripheral device 136 (e.g., above, below, or adjacent to peripheral device 136). Control unit 210 may perform object recognition within image data captured by image capture devices 138 to identify peripheral device 136 and/or a hand 132, fingers, thumb, arm or another part of the user, and track movements, positions, configuration, etc., of the peripheral device 136 and/or identified part(s) of the user to identify pre-defined gestures performed by the user. In response to identifying a pre-defined gesture, control unit 210 takes some action, such as selecting an option from an option set associated with a user interface (e.g., selecting an option from a UI menu), translating the gesture into input (e.g., characters), launching an application, manipulating virtual content (e.g., moving, rotating a virtual content item), generating and rendering virtual markings, generating and rending a laser pointer, or otherwise displaying content, and the like. For example, control unit 210 can dynamically generate and present a user interface, such as a menu, in response to detecting a pre-defined gesture specified as a "trigger" for revealing a user interface (e.g., turning peripheral device to a landscape or horizontal orientation (not shown)). In some examples, control unit 210 detects user input, based on the sensed data, with respect to a rendered user interface (e.g., a tapping gesture performed on a virtual UI element). In some examples, control unit 210 performs such functions in response to direction from an external device, such as console 106, which may perform object recognition, motion tracking and gesture detection, or any part thereof.

As an example, control unit 210 can utilize image capture devices 138A and 138B to analyze configurations, positions, movements, and/or orientations of peripheral device 136, hand 132 and/or arm 134 to identify a user interface gesture, selection gesture, stamping gesture, translation gesture, rotation gesture, drawing gesture, pointing gesture, etc., that may be performed by users with respect to peripheral device 136. The control unit 210 can render a UI menu (including UI elements) and/or a virtual surface (including any virtual content items) and enable the user to interface with that UI menu and/or virtual surface based on detection of a user interface gesture, selection gesture, stamping gesture, translation gesture, rotation gesture, and drawing gesture performed by the user with respect to the peripheral device, as described in further detail below.

In one example, surface 220 of peripheral device 136 is a presence-sensitive surface, such as a surface that uses capacitive, conductive, resistive, acoustic, or other technology to detect touch and/or hover input. In some examples, surface 220 of peripheral device 136 is a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). In such an example, peripheral device 136 can render a user interface or other virtual elements (e.g., virtual markings) on touchscreen 220 and detect user input (e.g., touch or hover input) on touchscreen 220. In that example, peripheral device 136 can communicate any detected user input to HMD 112 (and/or console 106 of FIG. 1A) using wireless communications links (e.g., Wi-Fi, near-field communication of short-range wireless communication such as Bluetooth), using wired communication links (not shown), or using other types of communication links. In some examples, peripheral device can include one or more input devices (e.g., buttons, trackball, scroll wheel) for interacting with virtual content (e.g., to select a virtual UI element, scroll through virtual UI elements).

In one example, in accordance with the techniques described herein, HMD 112 includes a security processor 224 for secure device attestation and mutual authentication of HMD 112 and other devices of the AR system. When HMD 112 is powered on and performs a secure boot, security processor 224 may authenticate SoCs of HMD 112 based on a pairing certificate stored in the NVM of the HMD. If a pairing certificate does not exist or the devices to be paired have changed, security processor 224 may send device certificates that each specifies information (e.g., identifier) of SoCs of HMD 112 to be attested. Security processor 224 may establish a secure communication channel between HMD 112 and peripheral device 136. As further described below, security processor 224 may apply double encryption of device certificates before sending the device certificates to a security server (e.g., security server 140 of FIGS. 1A, 1B) via peripheral device 136. When HMD 112 receives a pairing certificate generated by the security server, security processor 224 may store the pairing certificate in the NVM.

In one example, in accordance with the techniques described herein, peripheral device 136 includes a security processor 226 for secure device attestation and mutual authentication of peripheral device 136 and other devices of the AR system. When peripheral device 136 is powered on and performs a secure boot, security processor 226 may authenticate SoCs of peripheral device 136 based on the pairing certificate stored in the NVM of the peripheral device. If a pairing certificate does not exist or the devices to be paired have changed, security processor 226 may send device certificates that each specifies information (e.g., identifier) of SoCs of peripheral device 136 to be attested. As described above, security processor 226 may establish a secure communication channel between peripheral device 136 and HMD 112. Security processor 226 may also establish a secure communication channel between peripheral device 136 and the security server. When peripheral device 136 receives a pairing certificate generated by the security server, security processor 226 may store the pairing certificate in the NVM.

Figure 2B:
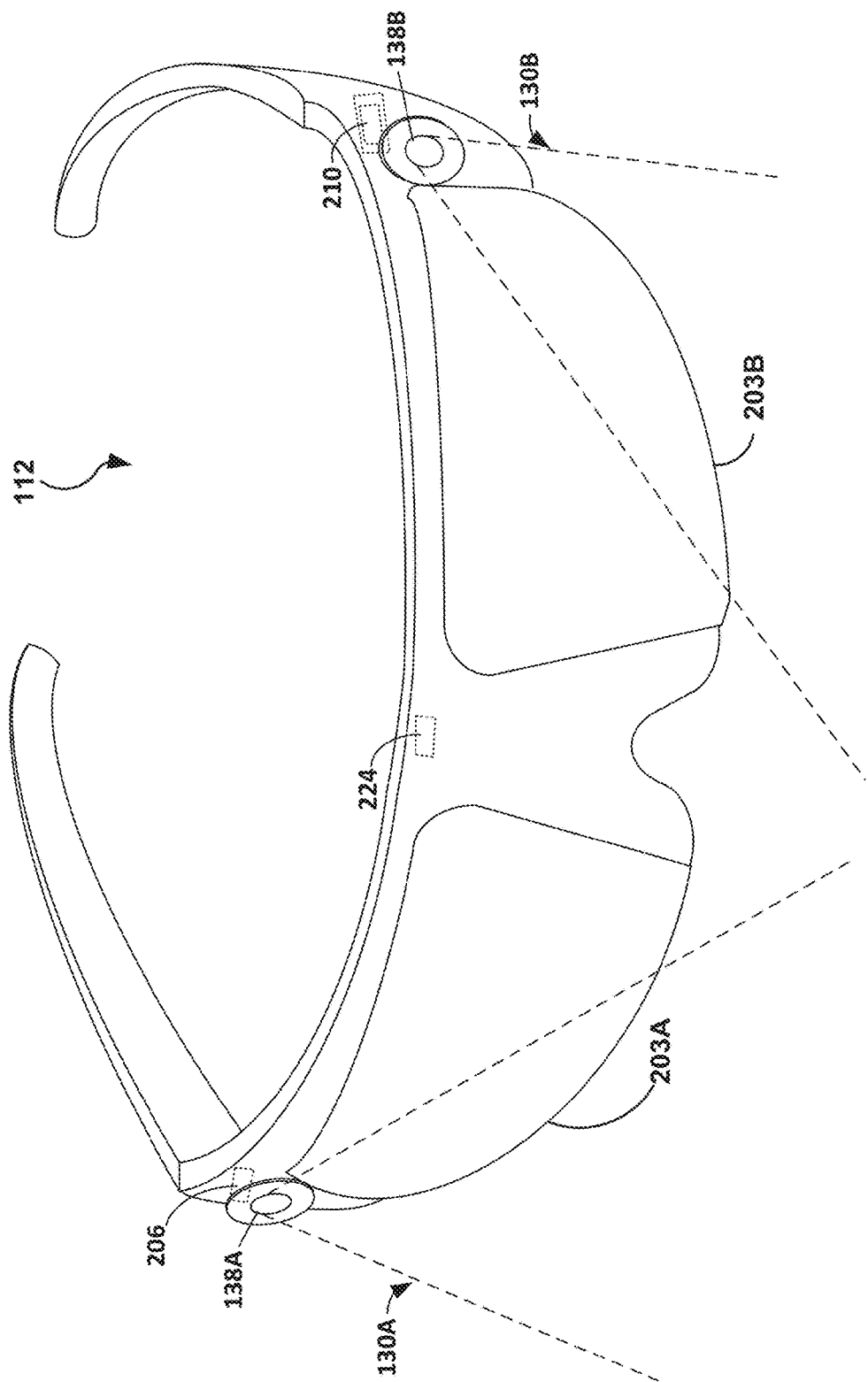
FIG. 2B is an illustration depicting another example HMD, in accordance with techniques described in this disclosure.

FIG. 2B is an illustration depicting another example HMD 112, in accordance with techniques described in this disclosure. As shown in FIG. 2B, HMD 112 may take the form of glasses. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. HMD 112 includes an internal control unit 210, which may include an internal power source and one or more printed-circuit boards having one or more processors, memory, and hardware to provide an operating environment for executing programmable operations to process sensed data and present artificial reality content on display 203.

Similar to the example illustrated in FIG. 2A, HMD 112 includes a security processor 224 for secure device attestation and mutual authentication of HMD 112 and other devices of the AR system. Security processor 224 may authenticate SoCs of HMD 112 based on the pairing certificate stored in the NVM of the HMD. If a pairing certificate does not exist or the devices to be paired have changed, security processor 224 may send device certificates that each specifies information (e.g., identifier) of SoCs of HMD 112 to be attested. Security processor 224 may establish a secure communication channel between HMD 112 and peripheral device 136. As further described below, security processor 224 may apply double encryption of device certificates before sending the device certificates to a security server via an intermediate device (e.g., peripheral device 136 of FIGS. 1A-1B or controllers 114 of FIG. 1B). When HMD 112 receives a pairing certificate generated by the security server, security processor 224 may store the pairing certificate in the NVM of the HMD.

Figure 3:
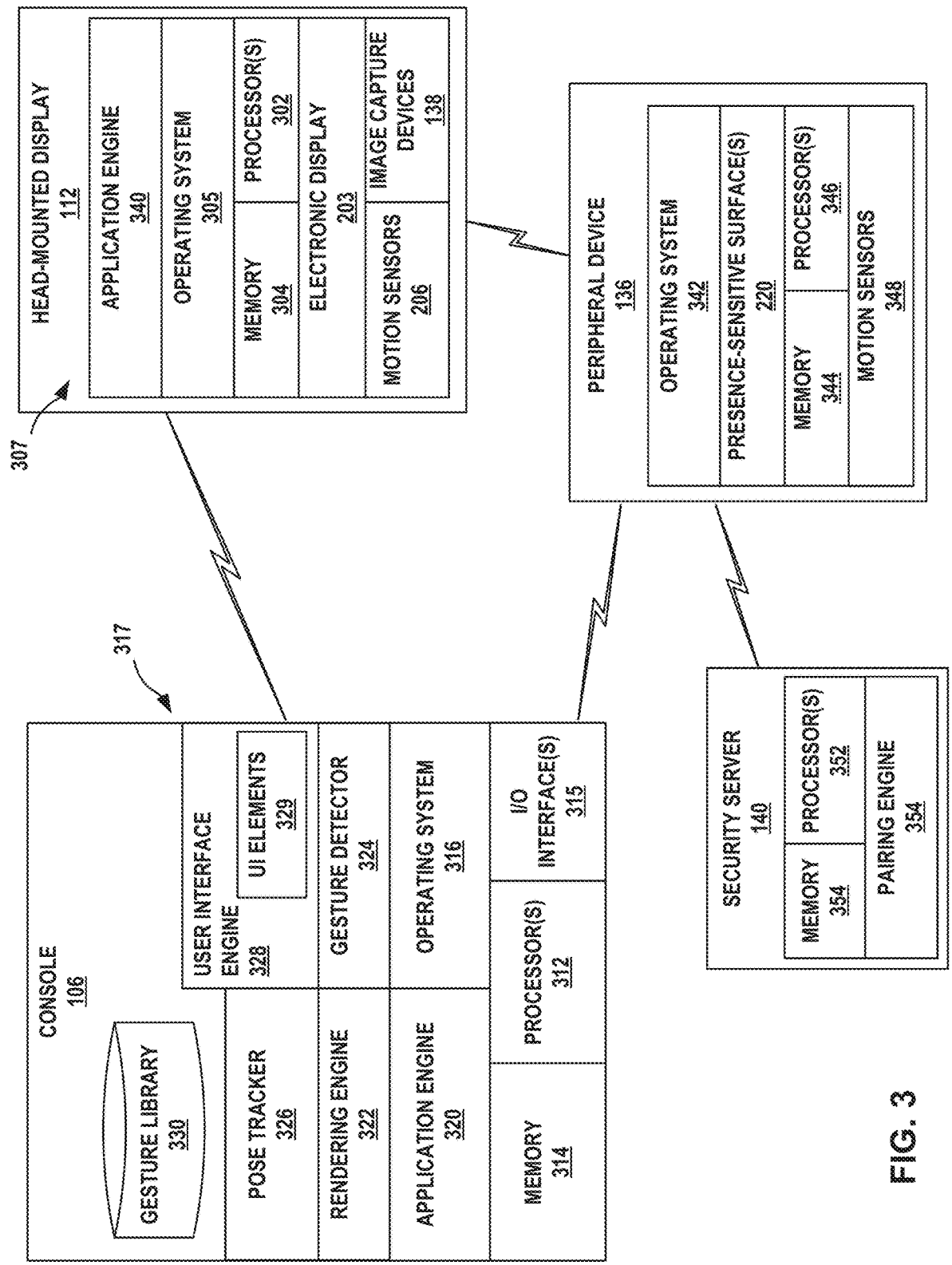
FIG. 3 is a block diagram showing example implementations of a console, an HMD, and a peripheral device of the multi-device artificial reality systems of FIGS. 1A, 1B, in accordance with techniques described in this disclosure.

FIG. 3 is a block diagram showing example implementations of console 106, HMD 112, and peripheral device 136 of multi-device artificial reality system 10, 20 of FIGS. 1A, 1B, in accordance with techniques described in this disclosure. In the example of FIG. 3, console 106 performs pose tracking, gesture detection, and user interface and virtual surface generation and rendering for HMD 112 based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to electronic display 203, motion sensors 206 and image capture devices 138. In some examples, processors 302 and memory 304 may be separate, discrete components. In other examples, memory 304 may be on-chip memory collocated with processors 302 within a single integrated circuit. As discussed with respect to the example of FIGS. 2A and 2B, processors 302 include a security processor 224 to provide secure device attestation and mutual authentication of HMD 112 when pairing with devices, e.g., peripheral device 136, used in conjunction within the AR environment.

In general, console 106 is a computing device that processes image and tracking information received from cameras 102 (FIG. 1B) and/or image capture devices 138 HMD 112 (FIGS. 1A, 2A, 2B) to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, peripheral devices, and the like. Moreover, the one or more I/O interfaces 315 may include one or more wired or wireless network interface controllers (NICs) for communicating with a network, such as network 104.

Software applications 317 of console 106 operate to provide an overall artificial reality application. In this example, software applications 317 include application engine 320, rendering engine 322, gesture detector 324, pose tracker 326, and user interface engine.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1B), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Pose tracker 326 may determine a current pose for peripheral device 136 and, in accordance with the current pose, triggers certain functionality associated with any rendered virtual content (e.g., places a virtual content item onto a virtual surface, manipulates a virtual content item, generates and renders one or more virtual markings, generates and renders a laser pointer). In some examples, pose tracker 326 detects whether the HMD 112 is proximate to a physical position corresponding to a virtual surface (e.g., a virtual pinboard), to trigger rendering of virtual content.

User interface engine 328 is configured to generate virtual user interfaces for rendering in an artificial reality environment. User interface engine 328 generates a virtual user interface to include one or more virtual user interface elements 329, such as a virtual drawing interface, a selectable menu (e.g., drop-down menu), virtual buttons, a directional pad, a keyboard, or other user-selectable user interface elements, glyphs, display elements, content, user interface controls, and so forth. Rendering engine 322 is configured to render, based on a current pose for peripheral device 136, the virtual user interface at a user interface position, in the artificial reality environment, that is locked relative to a position of peripheral device 136 in the artificial reality environment. The user interface position may be a position of one of presence-sensitive surfaces 220, and rendering engine 322 may scale, rotate, and otherwise transform the virtual user interface to apply projection to match the pose, size, and perspective of the presence-sensitive surface 220 such that the virtual user interface appears, in the artificial reality environment, to be overlaid on the presence-sensitive surface 220. User interface engine 328 may generate virtual user interface to be partially transparent, allowing presence-sensitive surface 220 to be seen by the user. This degree of transparency may be configurable.

Console 106 may output this virtual user interface and other artificial reality content, via a communication channel, to HMD 112 for display at HMD 112. Rendering engine 322 receives pose information for peripheral device 136 to continually update the user interface position and pose to match that of the peripheral device 136, such as that of one of presence-sensitive surfaces 220.

Based on the sensed data from any of the image capture devices 138 or 102, presence-sensitive surfaces 220, or other sensor devices, gesture detector 324 analyzes the tracked motions, configurations, positions, and/or orientations of peripheral device 136 and/or objects (e.g., hands, arms, wrists, fingers, palms, thumbs) of the user to identify one or more gestures performed by user 110. More specifically, gesture detector 324 analyzes objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. In some examples, gesture detector 324 may track movement, including changes to position and orientation, of the peripheral device 136, hand, digits, and/or arm based on the captured image data, and compare motion vectors of the objects to one or more entries in gesture library 330 to detect a gesture or combination of gestures performed by user 110. In some examples, gesture detector 324 may receive user inputs detected by presence-sensitive surface(s) of peripheral device and process the user inputs to detect one or more gestures performed by user 110 with respect to peripheral device 136.

Gesture detector 324 and gesture library 330 may be distributed, in whole or in part, to peripheral device 136 to process user inputs on peripheral device 136 to detect gestures. In such cases, presence-sensitive surface(s) 220 detects user inputs at locations of the surface. Peripheral device 136 executing gesture detector 324 can process the user inputs to detect one or more gestures of gesture library 330. Peripheral device 136 may send indications of the detected gestures to console 106 and/or HMD 112 to cause the console 106 and/or HMD 112 to responsively perform one or more actions. Peripheral device 136 may alternatively, or additionally, send indications of the user inputs at locations of the surface to console 106, and gesture detector 324 may process the user inputs to detect one or more gestures of gesture library 330.

Some entries in gesture library 330 may each define a gesture as a series or pattern of motion, such as a relative path or spatial translations and rotations of peripheral device 136, a user's hand, specific fingers, thumbs, wrists and/or arms. Some entries in gesture library 330 may each define a gesture as a configuration, position, and/or orientation of the peripheral device, user's hand and/or arms (or portions thereof) at a particular time, or over a period of time. Some entries in gesture library 330 may each define a gesture as one or more user inputs, over time, detected by presence-sensitive surface(s) 220 of peripheral device 136. Other examples of type of gestures are possible. In addition, each of the entries in gesture library 330 may specify, for the defined gesture or series of gestures, conditions that are required for the gesture or series of gestures to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

Each of the entries in gesture library 330 further may specify, for each of the defined gestures or combinations/series of gestures, a desired response or action to be performed by software applications 317. For example, certain specialized gestures may be pre-defined such that, in response to detecting one of the pre-defined gestures, user interface engine 328 dynamically generates a user interface as an overlay to artificial reality content being displayed to the user, thereby allowing the user 110 to easily invoke a user interface for configuring HMD 112 and/or console 106 even while interacting with artificial reality content. In other examples, certain gestures may be associated with other actions, such as providing input, selecting virtual objects (including virtual content items and/or UI elements), translating (e.g., moving, rotating) virtual objects, altering (e.g., scaling, annotating) virtual objects, making virtual markings, launching applications, and the like.

As an example, gesture library 330 may include entries that describe a peripheral device gesture, such as user interface activation gesture, a menu scrolling gesture, a selection gesture, a stamping gesture, a translation gesture, rotation gesture, drawing gesture, and/or pointing gesture. Gesture detector 324 may process image data from image capture devices 138 to analyze configurations, positions, motions, and/or orientations of peripheral device 136 and/or a user's hand to identify a user interface gesture, selection gesture, stamping gesture, translation gesture, rotation gesture, drawing gesture, pointing gesture, etc. that may be performed by users with respect to peripheral device 136. For example, the rendering engine 322 can render a pinboard user interface based on detecting, by the gesture detector 324, of the user interface gesture being performed and detecting, by the pose tracker 326, that the HMD 112 is proximate to a physical position corresponding to a virtual position of the virtual pinboard. The user interface engine 328 can define the menu that is displayed and can control actions that are performed in response to selections caused by selection gestures.

In the example shown in FIG. 3, peripheral device 136 includes one or more processors 346 and memory 344 that, in some examples, provide a computer platform for executing an operating system 342, which may be an embedded, real-time multitasking operating system, for instance, or other type of operating system. In turn, operating system 346 provides a multitasking operating environment for executing one or more software components. In some examples, peripheral device 136 includes one or more presence-sensitive surfaces 220 (e.g., one or more surfaces that use capacitive, conductive, resistive, acoustic, and/or other technology to detect touch and/or hover input). In one or more aspects, peripheral device 136 can be configured to detect touch and/or hover input at presence-sensitive surface 220, process that input (e.g., at processors 346) and communicate the touch and/or hover input and communicate information about that input (including location information about that input) to console 106 and/or HMD 112. As discussed with respect to the example of FIG. 2A, presence-sensitive surface(s) 220 can comprise a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). As further shown in FIG. 3, in this example, peripheral device 136 further includes one or more motion sensors 348, such as one or more accelerometers (also referred to as IMUs) that output data indicative of current acceleration of peripheral device 136, GPS sensors that output data indicative of a location or position of peripheral device, radar or sonar that output data indicative of distances of peripheral device 136 from various objects (e.g., from a wall or other surface), or other sensors that provide indications of a location, position, and/or orientation of peripheral device or other objects within a physical environment. In some examples, processors 346 are coupled to presence-sensitive surface(s) 220 and motion sensors 246. In some examples, processors 346 and memory 344 may be separate, discrete components. In other examples, memory 344 may be on-chip memory collocated with processors 346 within a single integrated circuit. In one or more aspects, peripheral device 136 can coexist with the HMD and, in some example, operate as an auxiliary input/output device for the HMD in the virtual environment. In some examples, the peripheral device 136 may operate as an artificial reality co-processing device to which some of the functions of the HMD are offloaded. In one or more aspects, peripheral device 136 can be a smartphone, tablet, or other hand-held device.

In some examples, each of processors 302, 312, 346 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314, 344 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

In accordance with the techniques described herein, the multi-device artificial reality system of FIG. 3 enables secure, privacy-preserving device attestation and mutual authentication of multiple devices when paired with each other. For example, as discussed with respect to the examples of FIGS. 2A and 2B, processors 346 of peripheral device 136 may include a security processor 226 to provide secure device attestation and mutual authentication of peripheral device 136 and other devices when pairing with multiple devices of the AR system, e.g., HMD 112 and/or console 106, used in conjunction within the AR environment. Similarly, processors 302 of HMD 112 may include a security processor to provide secure device attestation and mutual authentication of HMD 112 and other devices when pairing with multiple devices of the AR system, e.g., peripheral device 136 and/or console 106, used in conjunction within the AR environment. Processors 312 of console 106 may similarly include a security processor implementing the techniques described herein to provide secure device attestation and mutual authentication of HMD 112, peripheral device 136 and other devices when pairing with multiple devices of the AR system.

In the example shown in FIG. 3, security server 140 includes one or more processors 352 and memory 354 that, in some examples, provide a computer platform for executing pairing engine 354. Pairing engine 354 may generate pairing certificates that each includes information specifying particular devices permitted for pairing, e.g., peripheral device 136, HMD 112 and, in some examples, console 106. In some examples, memory 354 may store one or more policies used to generate a pairing certificate. In some examples, the one or more policies are stored in an external memory. In some examples, memory 354 may maintain a directory of pairing certificates used to generate the pairing certificate. In some examples, an external memory maintains the directory of pairing certificates. Further, each of memories 304, 314, 314 of HMD 112, console 106 and peripheral device 136, respectively, may include a non-volatile memory for securely storing a pairing certificate as described herein.

Figure 4:
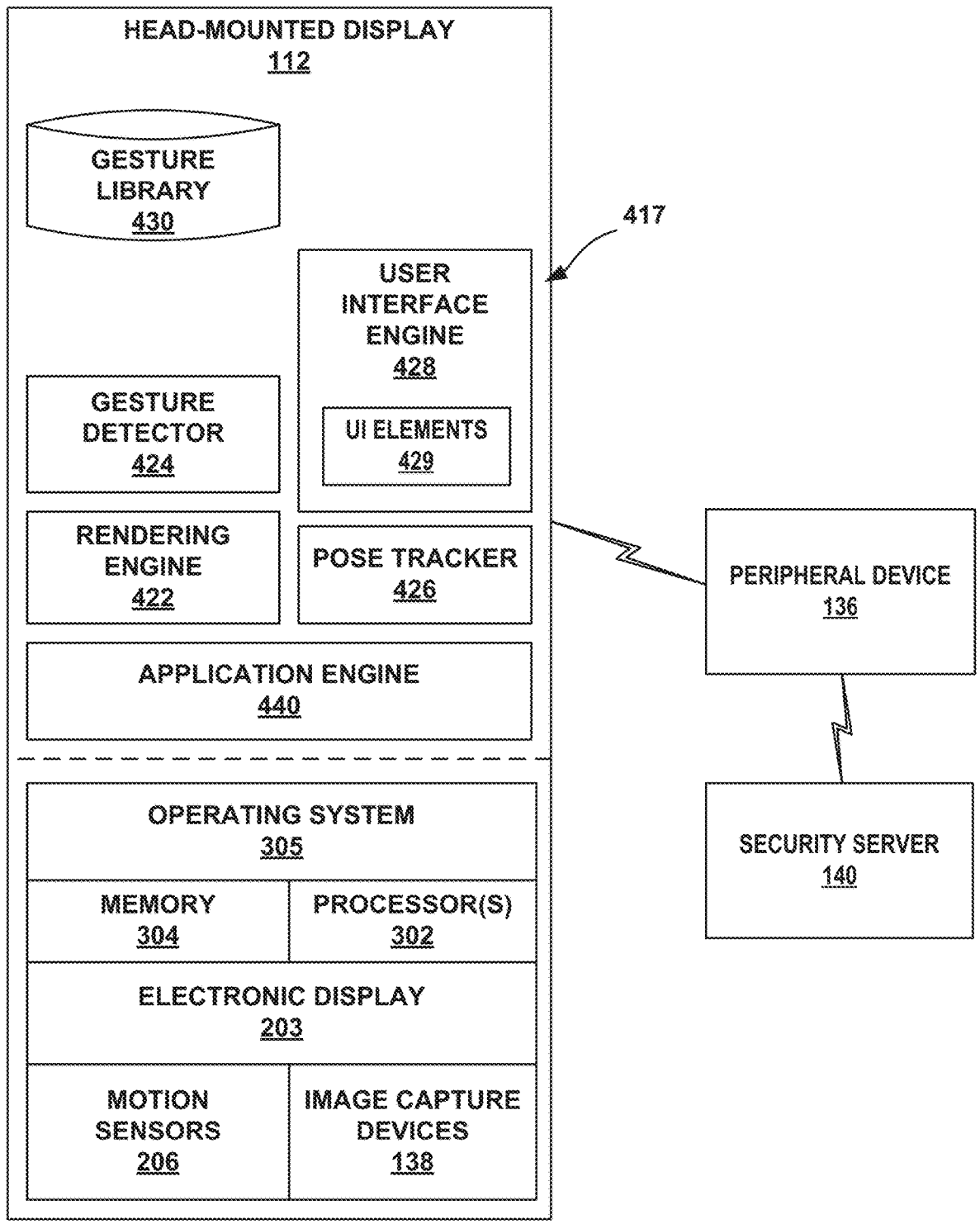
FIG. 4 is a block diagram depicting an example in which gesture detection, user interface generation, and virtual surface functions are performed by the HMD of the artificial reality systems of FIGS. 1A, 1B, in accordance with the techniques described in this disclosure.

FIG. 4 is a block diagram depicting an example in which gesture detection and virtual surface generation is performed by HMD 112 of the artificial reality systems of FIGS. 1A, 1B in accordance with the techniques described in this disclosure.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 138.

In the example of FIG. 4, software components 417 operate to provide an overall artificial reality application. In this example, software applications 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct virtual user interfaces overlaid on, or as part of, the artificial content for display to user 110.

Similar to the examples described with respect to FIG. 3, based on the sensed data from any of the image capture devices 138 or 102, presence-sensitive surfaces of peripheral device 136, or other sensor devices, gesture detector 424 analyzes the tracked motions, configurations, positions, and/or orientations of peripheral device 136 and/or objects (e.g., hands, arms, wrists, fingers, palms, thumbs) of the user to identify one or more gestures performed by user 110.

More specifically, gesture detector 424 may analyze objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. A virtual surface application generates virtual surfaces as part of, e.g., overlaid upon, the artificial reality content to be displayed to user 110 and/or performs actions based on one or more gestures or combinations of gestures of user 110 detected by gesture detector 424. Gesture detector 424 may analyze objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. In some examples, gesture detector 424 may track movement, including changes to position and orientation, of the peripheral device 136, hand, digits, and/or arm based on the captured image data, and compare motion vectors of the objects to one or more entries in gesture library 430 to detect a gesture or combination of gestures performed by user 110. In some examples, gesture detector 424 may receive user inputs detected by presence-sensitive surface(s) of peripheral device and process the user inputs to detect one or more gestures performed by user 110 with respect to peripheral device 136. Gesture library 430 is similar to gesture library 330 of FIG. 3. Some of all of the functionality of gesture detector 424 may be executed by peripheral device 136.

Similar to the examples described with respect to FIG. 3, processors 302 may include a security processor 224 and memory 304 may include a non-volatile memory for security storing a pairing certificate as described herein to provide secure device attestation and mutual authentication of HMD 112 when pairing with devices, e.g., peripheral device 136, used in conjunction within the AR environment.

Figure 5A:
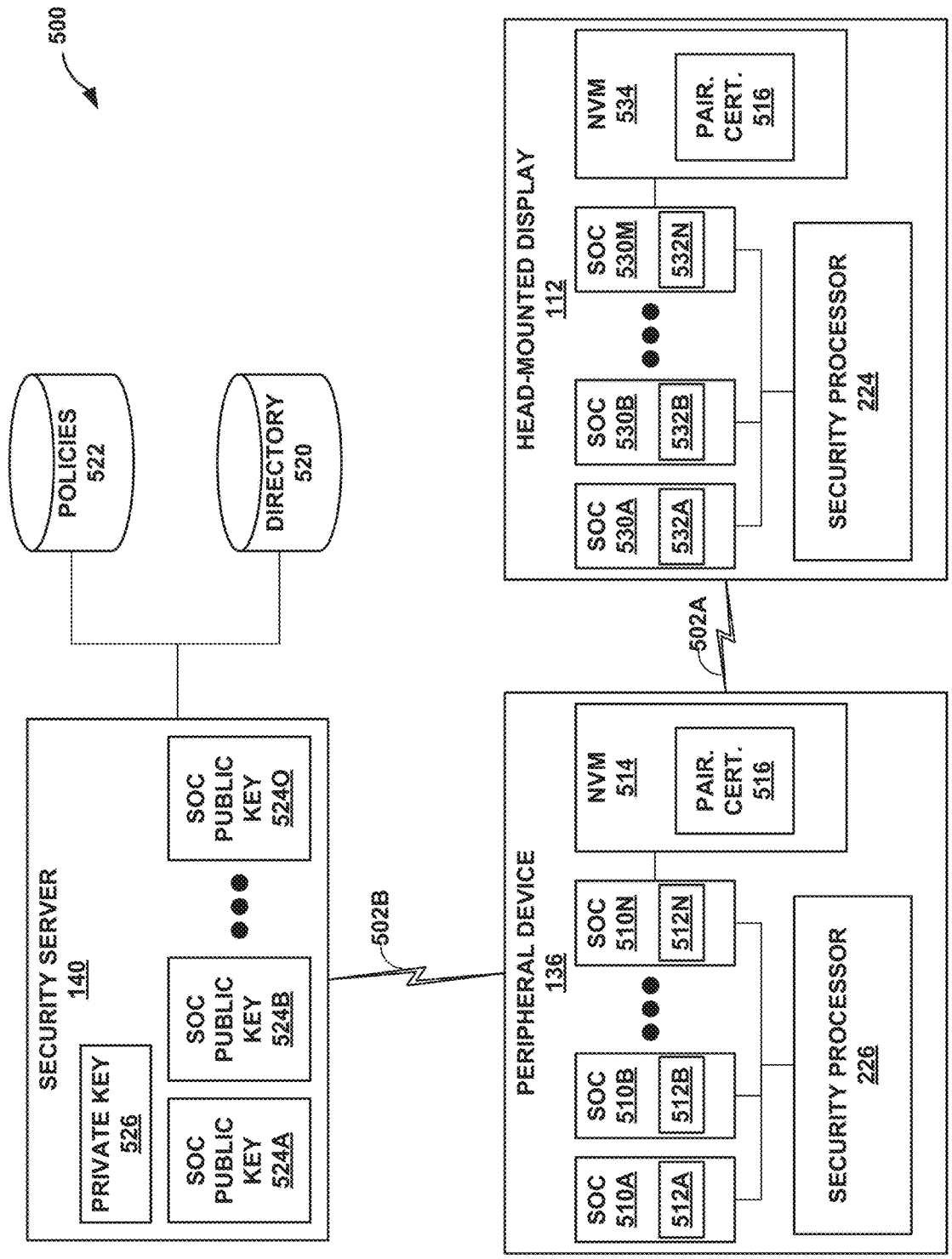
FIG. 5A is a block diagram showing an example implementation of distributed architecture for a multi-device artificial reality system, in accordance with the techniques described in this disclosure.

FIG. 5A is a block diagram showing an example implementation of a distributed architecture for a multi-device artificial reality system. In this example, one or more devices (e.g., HMD 112 and peripheral device 136) are implemented using one or more System-on-a-Chip (SoC) integrated circuits, in accordance with the techniques described in this disclosure. HMD 112 may be an example of any of HMDs 112 of FIGS. 1A-4. HMD 112 may be part of an artificial reality system, such as artificial reality systems 10, 20 of FIGS. 1A, 1B, or may operate as a stand-alone, mobile artificial reality system configured to implement the techniques described herein.

Figure 5B:
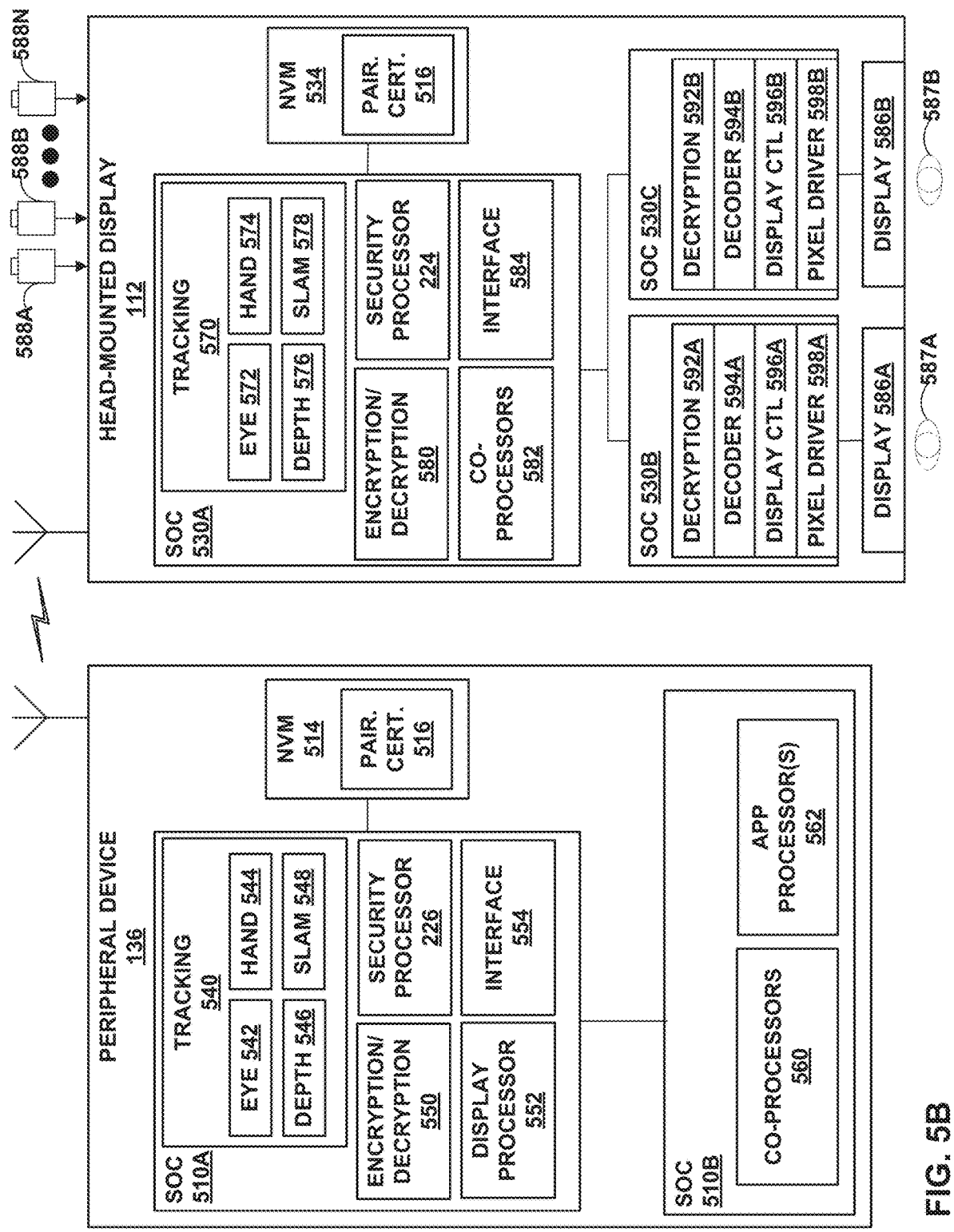
FIG. 5B is a block diagram illustrating a more detailed example implementation of a distributed architecture for a multi-device artificial reality system in which one or more devices (e.g., peripheral device and HMD) are implemented using one or more SoC integrated circuits within each device, in accordance with the techniques described in this disclosure.

In this example, HMD 112 includes SoCs 530A-530M (collectively, "HMD SoCs 530"), security processor 224, and non-volatile memory 534. In general, SoCs 530 represent a collection of specialized integrated circuits arranged in a distributed architecture and configured to provide an operating environment for artificial reality applications. As examples, SoC integrated circuits may include specialized functional blocks operating as co-application processors, sensor aggregators, encryption/decryption engines, security processors, hand/eye/depth tracking and pose computation elements, video encoding and rendering engines, display controllers and communication control components. A more detailed example is shown in FIG. 5B.

In the example of FIG. 5A, security processor 224 of HMD 112 provides secure device attestation and mutual authentication for HMD when pairing with other devices, e.g., peripheral device 136, that are used in conjunction within the AR environment. As discussed with respect to the example of FIGS. 2A and 2B, when HMD 112 is powered on and performs a secure boot, security processor 224 may authenticate one or more SoCs 530 of HMD 112 and SoCs of other devices based on the pairing certificate generated by security server 140 and locally stored in NVM 534. If a pairing certificate does not exist or the device pairings have changed, security processor 224 may send to security server 140 device certificates of SoCs 530 for attestation.

To securely attest one or more SoCs 530 of HMD 112, security processor 226 of HMD 112 may, in some examples, retrieve respective device certificates 532A-532N (collectively, "HMD device certificates 532") from each of SoCs 530, encrypt HMD device certificates 532 and communicate encrypted HMD device certificates 532 to security server 140 via peripheral device 136. For example, HMD 112 may encrypt HMD device certificates 532 with a server public key (e.g., one of SoC public keys 524A-524N) for encrypted communication with security server 140 and a first session key ($S_{k1}$) used for secure communication between peripheral device 136 and HMD 112A over communication channel 502A. The encryption of HMD device certificates 532 with both the server public key and then the first session key, is referred to herein as "double encryption." In some examples, the session key may be a secret symmetric key used to encrypt and decrypt data. In some examples, HMD 112 may sign HMD device certificates 532 with respective private keys (e.g., Elliptic-curve cryptography private keys). For example, HMD 112 may hash HMD device certificates 532 with the private key, which may be verified with a public key.

HMD 112 sends the double encrypted HMD device certificates 532 to peripheral device 136 over communication channel 502A. Communication channel 502A may be one or more wired or wireless communications links (e.g., Wi-Fi, near-field communication of short-range wireless communication such as Bluetooth).

Peripheral device 136 includes SoCs 510A-510N (collectively, "peripheral device SoCs 510"), security processor 226, and non-volatile memory 514. SoCs 510 may each be configured to support an artificial reality application, such as SoCs operating as co-application processors, sensor aggregators, display controllers, etc. Security processor 226 provides secure device attestation and mutual authentication of peripheral device 136 when pairing with other devices, e.g., HMD 112, used in conjunction within the AR environment. As discussed with respect to the example of FIGS. 2A and 2B, when peripheral device 136 is powered on and performs a secure boot, security processor 226 may authenticate one or more SoCs 510 of peripheral device 136 based on the pairing certificate stored in NVM 514. If a pairing certificate does not exist or the devices to be paired have changed, security processor 226 may send to security server 140 device certificates 512A-512N (collectively, "peripheral device certificates 512") of SoCs 510 for attestation.

For example, when peripheral device 136 receives double encrypted HMD device certificates 532, peripheral device 136 decrypts the double encrypted HMD device certificates 532 using the first session key $S_{k1}$ to recover HMD device certificates 532 encrypted with the public key. Peripheral device 136 generates a device attestation request that groups peripheral device certificates 512 of SoCs 510 and the encrypted HMD device certificates 532. Peripheral device 136 encrypts the device attestation request with a second session key ($S_{k2}$) that is used for secure communication between peripheral device 136 and security server 140 over communication channel 502B.

Peripheral device 136 sends the encrypted device attestation request to security server 140 over communication channel 502B. Communication channel 502B may be one or more wired or wireless communications links (e.g., Wi-Fi, near-field communication of short-range wireless communication such as Bluetooth).

When security server 140 receives the encrypted device attestation request, security server 140 decrypts the encrypted device attestation request with the second session key ($S_{k2}$) to recover peripheral device certificates 512 and encrypted HMD device certificates 532. Security server 140 then decrypts the encrypted HMD device certificates 532 with the private key 526. Security server 140 verifies peripheral device certificates 512 and HMD device certificates 532 and generates a pairing certificate for the device attestation request. The pairing certificate includes information specifying particular devices permitted for pairing. In the illustrated example of FIG. 5A, the pairing certificate includes and precisely specifies one or more peripheral device certificates 512 of SoCs 510 of peripheral device 136 and one or more HMD device certificates 532 of SoCs 530 of HMD 112.

In some examples, security server 140 may generate the pairing certificate based on one or more policies 522 that control the permitted relationship between the devices. For example, the one or more policies 522 may define a one-to-one pairing relationship, a one-to-many pairing relationship, many-to-one pairing relationship, or a many-to-many pairing relationship. As one example, security server 140 may determine, based on policies 522, that peripheral device 136 is only permitted with a one-to-one pairing relationship with an HMD. In this example, security server 140 generates a pairing certificate to pair HMD 112 and peripheral device 136 if there are no other HMDs paired with peripheral device 136.

In some examples, security server 140 maintains a directory 520 that stores pairing certificates. Prior to generating a pairing certificate, security server 140 may refer to directory 520 to determine whether generating a new pairing certificate would violate policies 522. For example, peripheral device 136 may have an existing one-to-one pairing relationship with another HMD. In the event a security server 140 receives a new device attestation request to pair HMD 112 and peripheral device 136, security server 140 may refer to directory 520 and determines that peripheral device 136 is already paired with another HMD. In this example, security server 140 may deny the device attestation request because generating a new pairing certificate would violate the existing one-to-one pairing relationship permitted for peripheral device 136.

When the device attestation request is granted, security server 140 may generate a pairing certificate including information specifying the peripheral device certificates and HMD device certificates permitted for pairing. In some examples, security server 140 may encrypt the pairing certificate prior to sending the pairing certificate to peripheral device 136. For example, security server 140 may encrypt a pairing certificate with the second session key ($S_{k2}$) and send the encrypted pairing certificate to peripheral device 136 over communication channel 502B. In some examples, security server 140 may digitally sign (referred to as "digital signature") the pairing certificate by encrypting a hash of the pairing certificate with private key 526 such that peripheral device 136 may validate the authenticity and integrity of the pairing certificate (e.g., that the pairing certificate has not been tampered with).

When peripheral device 136 receives the encrypted pairing certificate, peripheral device 136 decrypts the encrypted pairing certificate using the second session key ($S_{k2}$). In the examples in which security server 140 digitally signs the hash of the pairing certificate with private key 526, peripheral device 136 use the public key to verify the digital signature to determine whether the pairing certificate that was received was the pairing certificate sent by security server 140. Peripheral device 136 stores the pairing certificate 516 in non-volatile memory 514 (NVM 514). Although NVM 514 is illustrated as internal to peripheral device 136, NVM 514 may in some examples be external to peripheral device 136. In some examples, peripheral device 136 may encrypt the pairing certificate 516 with a public key or symmetric key prior to storing the pairing certificate. This may prevent an attacker to replay data in the NVM in a forged device.

Peripheral device 136 sends the pairing certificate to HMD 112. Prior to sending the pairing certificate to HMD 112, peripheral device 136 may encrypt the pairing certificate using the first secret symmetric key ($S_{k1}$) and sends the encrypted pairing certificate to HMD 112.

When HMD 112 receives the encrypted pairing certificate, HMD 112 decrypts the encrypted pairing certificate using the first secret symmetric key ($S_{k1}$) and stores the pairing certificate 516 in non-volatile memory 534 (NVM 534). Although NVM 534 is illustrated as internal to HMD 112, NVM 534 may in some examples be external to HMD 112. In some examples, HMD 112 may encrypt the pairing certificate 516 with a public key or symmetric key prior to storing the pairing certificate. This may prevent an attacker to replay data in the NVM in a forged device.

By storing pairing certificate 516 in each of the devices, e.g., peripheral device 136, and HMD 112, each of the devices may mutually authenticate the SoCs in a subsequent pairing. For example, unlike an asymmetric architecture in which only a peripheral device maintains connectivity with the security server (and therefore requiring the HMD to trust the peripheral device for connecting to the security server), each of peripheral device 136 and HMD 112 stores a pairing certificate in NVM such that subsequent pairings between a previously attested peripheral device 136 and HMD 112 can occur without connecting to security server 140. That is, when the peripheral device 136 or HMD 112 are powered on and perform a secure boot, the devices may mutually authenticate SoCs based on pairing certificate 516 stored in the respective NVMs. For example, SoCs 510 of peripheral device 136 and SoCs 530 of HMD 112 may decrypt pairing certificate from the NVM using respective keys, complete integrity check and verify presence of their own IDs. For example, peripheral device 136 may decrypt (e.g., using a private key) pairing certificate 516 stored in NVM 514 and checks for whether pairing certificate 516 specifies device certificates of SoCs 510 of peripheral device 136. Similarly, HMD 112 may decrypt pairing certificate 516 stored in NVM 534 and checks for whether pairing certificate 516 specifies device certificates of SoCs 530 of HMD 112.

In some examples, peripheral device 136 and HMD 112 may request Hash-based Message Authentication Code (HMAC) signatures of pairing certificates 516, and if the HMAC signatures match, the devices are mutually authenticated.

In some examples, each of the devices may include a designated SoC operating as a gatekeeper that has writable access to the NVM for storing the pairing certificate in the NVM. The gatekeeper SoC and/or a secure boot processor within a given device uses the pairing certificate to authenticate the SoCs within that device and to perform mutual authentication of the SoCs of other devices in the AR system. In this example, SoC 510N may operate as a gatekeeper SoC for peripheral device 136 and SoC 530M may operate as a gatekeeper SoC for HMD 112.

FIG. 5B is a block diagram illustrating a more detailed example implementation of a distributed architecture for a multi-device artificial reality system in which one or more devices (e.g., peripheral device 136 and HMD 112) are implemented using one or more SoC integrated circuits within each device. As described, peripheral device 136 and HMD 112 are architected and configured to enable secure, privacy-preserving device attestation and mutual authentication in accordance with techniques described in this disclosure.

In general, the SoCs illustrated in FIG. 5B represent a collection of specialized integrated circuits arranged in a distributed architecture, where each SoC integrated circuit includes various specialized functional blocks configured to provide an operating environment for artificial reality applications. FIG. 5B is merely one example arrangement of SoC integrated circuits. The distributed architecture for a multi-device artificial reality system may include any collection and/or arrangement of SoC integrated circuits.

In this example, SoC 530A of HMD 112 comprises functional blocks including security processor 224, tracking 570, an encryption/decryption 580, co-processors 582, and an interface 584. Tracking 570 provides a functional block for eye tracking 572 ("eye 572"), hand tracking 574 ("hand 574"), depth tracking 576 ("depth 576"), and/or Simultaneous Localization and Mapping (SLAM) 578 ("SLAM 578"). For example, HMD 112 may receive input from one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 588A-588N (collectively, "image capture devices 588"). Image capture devices may include video cameras, laser scanners, Doppler radar scanners, depth scanners, or the like, configured to output image data representative of the physical environment. More specifically, image capture devices capture image data representative of objects (including peripheral device 136 and/or hand) in the physical environment that are within a field of view of image capture devices, which typically corresponds with the viewing perspective of HMD 112. Based on the sensed data and/or image data, tracking 570 determines, for example, a current pose for the frame of reference of HMD 112 and, in accordance with the current pose, renders the artificial reality content.

Encryption/decryption 580 is a functional block to encrypt outgoing data communicated to peripheral device 136 or security server and decrypt incoming data communicated from peripheral device 136 or security server. Encryption/decryption 580 may support symmetric key cryptography to encrypt/decrypt data with a session key (e.g., secret symmetric key). For example, when sending the device certificates to the security server via peripheral device 136 for attestation, encryption/decryption 580 encrypts device certificates of SoCs 530A-530C with a first session key ($S_{k1}$) for securely communicating the device certificates to peripheral device 136. Encryption/decryption 580 also encrypts the device certificates with a public key to securely communicate the device certificates to the security server. In response to receiving a pairing certificate encrypted with the second session key ($S_{k2}$) from peripheral device 136, encryption/decryption 580 decrypts the encrypted pairing certificate using the second session key ($S_{k2}$). In some examples, the security server may digitally sign the pairing certificate by encrypting a hash of the pairing certificate with a private key. In these examples, encryption/decryption 580 verifies the signature using a server public key and verifies the authenticity and integrity of the pairing certificate (e.g., by running the pairing certificate through the same hashing algorithm as the security server).

Co-application processors 582 includes various processors such as a video processing unit, graphics processing unit, digital signal processors, encoders and/or decoders, and/or others.

Interface 584 is a functional block that includes one or more interfaces for connecting to functional blocks of SoC 530A. As one example, interface 584 may include peripheral component interconnect express (PCIe) slots. SoC 530A may connect with SoC 530B, 530C using interface 584. SoC 530A may connect with a communication device (e.g., radio transmitter) using interface 584 for communicating with other devices, e.g., peripheral device 136.

As discussed with respect to the example of FIG. 5A, security processor 224 provides secure device attestation and mutual authentication of HMD 112 when pairing with devices, e.g., peripheral device 136, used in conjunction within the AR environment. When HMD 112 is powered on and performs a secure boot, security processor 224 may authenticate SoCs 530A-530C of HMD 112 based on the pairing certificate stored in NVM 534. If a pairing certificate does not exist or the devices to be paired have changed, security processor 224 may send to the security server the device certificates of SoCs 530A-530C for attestation.

SoCs 530B and 530C each represents display controllers for outputting artificial reality content on respective displays, e.g., displays 586A, 586B (collectively, "displays 586"). In this example, SoC 530B may include a display controller for display 568A to output artificial reality content for a left eye 587A of a user. For example, SoC 530B includes a decryption block 592A, decoder block 594A, display controller 596A, and/or a pixel driver 598A for outputting artificial reality content on display 586A. Similarly, SoC 530C may include a display controller for display 568B to output artificial reality content for a right eye 587B of the user. For example, SoC 530C includes decryption 592B, decoder 594B, display controller 596B, and/or a pixel driver 598B for generating and outputting artificial reality content on display 586B. Displays 568 may include Light-Emitting Diode (LED) displays, Organic LEDs (OLEDs), Quantum dot LEDs (QLEDs), Electronic paper (E-ink) displays, Liquid Crystal Displays (LCDs), or other types of displays for displaying AR content.

Peripheral device 136 includes SoCs 510A and 510B configured to support an artificial reality application. In this example, SoC 510A comprises functional blocks including security processor 226, tracking 540, an encryption/decryption 550, a display processor 552, and an interface 554. Tracking 540 is a functional block providing eye tracking 542 ("eye 542"), hand tracking 544 ("hand 544"), depth tracking 546 ("depth 546"), and/or Simultaneous Localization and Mapping (SLAM) 548 ("SLAM 548"). For example, peripheral device 136 may receive input from one or more accelerometers (also referred to as inertial measurement units or "IMUs") that output data indicative of current acceleration of peripheral device 136, GPS sensors that output data indicative of a location of peripheral device 136, radar or sonar that output data indicative of distances of peripheral device 136 from various objects, or other sensors that provide indications of a location or orientation of peripheral device 136 or other objects within a physical environment. Peripheral device 136 may in some examples also receive image data from one or more image capture devices, such as video cameras, laser scanners, Doppler radar scanners, depth scanners, or the like, configured to output image data representative of the physical environment. Based on the sensed data and/or image data, tracking block 540 determines, for example, a current pose for the frame of reference of peripheral device 136 and, in accordance with the current pose, renders the artificial reality content to HMD 112.

Encryption/decryption 550 encrypts outgoing data communicated to HMD 112 or security server and decrypts incoming data communicated from HMD 112 or security server. Encryption/decryption 550 may support symmetric key cryptography to encrypt/decrypt data using a session key (e.g., secret symmetric key). For example, in response to receiving one or more device certificates of SoCs 530 of HMD 112 encrypted with a first session key ($S_{k1}$), encryption/decryption 550 decrypts the encrypted device certificates using the first session key ($S_{k1}$). Encryption/decryption 550 encrypts a device attestation request including the device certificates of SoCs 510 and device certificates of SoCs 530 with a second session key ($S_{k2}$) to securely communicate between peripheral device 136 and the security server. In response to receiving a pairing certificate encrypted with the second session key ($S_{k2}$), encryption/decryption 550 decrypts the encrypted pairing certificate using the second session key ($S_{k2}$). In some examples, the security server may digitally sign the pairing certificate by encrypting a hash of the pairing certificate with a private key. In these examples, encryption/decryption 550 verifies the signature using a server public key and verify the authenticity and integrity of the pairing certificate (e.g., by running the pairing certificate through the same hashing algorithm as the security server).

Display processor 552 includes one or more processors such as a video processing unit, graphics processing unit, encoders and/or decoders, and/or others, for rendering artificial reality content to HMD 112.

Interface 554 includes one or more interfaces for connecting to functional blocks of SoC 510A. As one example, interface 584 may include peripheral component interconnect express (PCIe) slots. SoC 510A may connect with SoC 510B using interface 584. SoC 510A may connect with one or more communication devices (e.g., radio transmitter) using interface 584 for communicating with other devices, e.g., HMD 112.

As discussed with respect to the example of FIG. 5A, security processor 226 provides secure device attestation and mutual authentication of peripheral device 136 when pairing with devices, e.g., HMD 112, used in conjunction within the AR environment. When peripheral device 136 is powered on and performs a secure boot, security processor 226 may authenticate SoCs 510A, 510B of peripheral device 136 based on the pairing certificate stored in NVM 514. If a pairing certificate does not exist or the devices to be paired have changed, security processor 226 may send to security server 140 device certificates of SoCs 510A, 510B for attestation.

SoC 510B includes co-application processors 560 and application processors 562. In this example, co-application processors 560 includes various processors, such as a vision processing unit (VPU), a graphics processing unit (GPU), and/or central processing unit (CPU). Application processors 562 may include a processing unit for executing one or more artificial reality applications to generate and render, for example, a virtual user interface to a surface of peripheral device 136 and/or to detect gestures performed by a user with respect to peripheral device 136.

Figure 6:
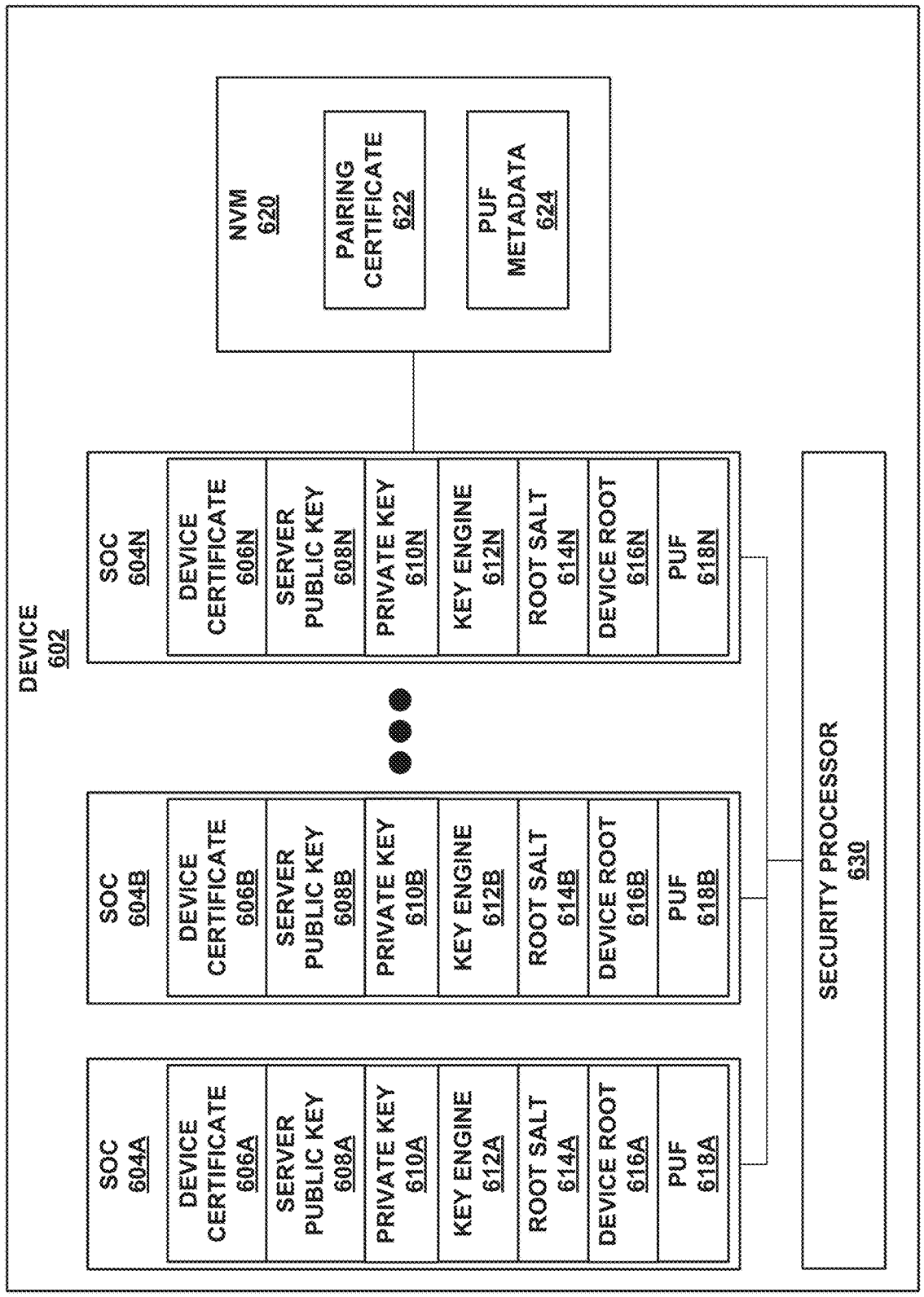
FIG. 6 is a block diagram illustrating an example device including SoCs in further detail, in accordance with techniques described in this disclosure.

FIG. 6 is a block diagram illustrating an example device including SoCs in further detail, in accordance with aspects of the disclosure. Device 602 may represent any of the multiple devices used in conjunction within the artificial reality system, such as one of peripheral device 136 or HMD 112 of FIGS. 5A-5B. In this example, device 602 includes SoCs 604A-604N (collectively, "SoCs 604"), non-volatile memory (NVM) 620, and security processor 630.

As shown, in this example, each of SoCs 604 includes internal memory, such as non-volatile, read-only memory, that is programmed during manufacture to store certain digital certificates and keys. For example, SoCs 604 may be configured to store respective device certificates 606A-606N (collectively, "device certificates 606"), security server public keys 608A-608N (collectively, "server public keys 608"), and private keys 610A-610N (collectively, "private keys 610").

Device certificates 606 each represent a digital certificate that provides proof of the device's unique identity. In the illustrated example of FIG. 6, device certificate 606A uniquely identifies SoC 604A, device certificate 606B uniquely identifies SoC 604B, and so on. Device certificate may include information such as an identifier, serial number, expiry, etc. The device certificate may be provisioned by a manufacturer and is typically read-only.

Further, in this example, server public keys 608 each represents a signing key of a security server (e.g., security server 140 of FIG. 5A). In some examples, each of server public keys 608 represents a 521 bit Elliptic-curve cryptography public key. In some examples, server public keys 608 are stored in one time programmable (OTP) memory. Each of private keys 610 may represent a key unique to each SoC that is not physically stored. In some examples, private keys 610 may represent a 384 bit Elliptic-curve cryptography private key.

In some examples, SoCs 604 may include physically unclonable functions (PUFs) 618A-618N (collectively, "PUFs 618"), respectively, as an element within the integrated circuit. In general, a PUF is a unique identifier derived from physical characteristics of the SoC integrated circuit. In some examples, PUFs 618 are stored in OTP. In some examples, pairing certificate 622 in NVM 620 may be encrypted with device specific Advanced Encryption Standard (AES) keys derived from PUFs 618.

In some examples, SoCs 604 include key engines 612A-612N (collectively, "key engines 612") that each represent a compute engine, e.g., a National Institute of Standards and Technology (NIST) compute engine, to generate symmetric keys (e.g., session keys) and public keys from a system secret key.

In some examples, SoCs 604 include root salts 614A-614N (collectively, "root salts 614") used to safeguard the storage of a key. For example, a root salt is a random value and is appended to a key, which is then hashed and stored. In some examples, root salts 614 are stored within a one-time programmable (OTP) memory of the respective SOC 604.

In some examples, SoCs 604 include device roots 616A-616N (collectively, "device roots 616"). Device roots 616 represent system root keys derived from PUFs 618. In some examples, the device roots 616 are not physically stored.

NVM 620 represents an example of NVM 514 of peripheral device 136 or NVM 534 of HMD 112 in the example discussed above with respect to FIG. 5A. NVM 620 may store a pairing certificate 622 and/or PUF metadata 624. As described above, pairing certificate 622 includes information specifying one or more of SoCs 604 of device 602 permitted for pairing with one or more SoCs of another device. PUF metadata 624 may represent helper data used to recreate a PUF key in the presence of a small fraction of unstable bits.

Figure 7:
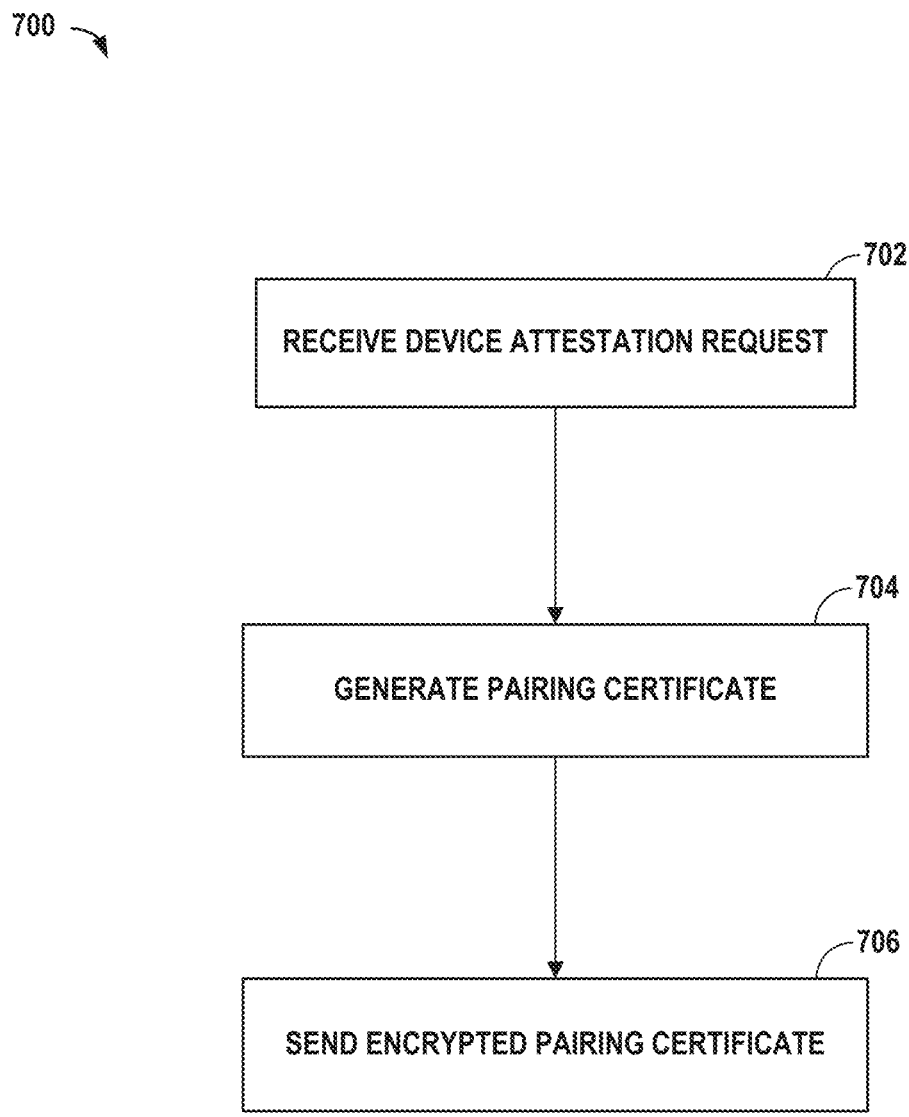
FIG. 7 is a flowchart illustrating an example operation of a security server for securing device attestation and mutual authentication of multiple devices used in conjunction within the AR environment in accordance with aspects of the disclosure, in accordance with techniques described in this disclosure.

FIG. 7 is a flowchart illustrating an example operation of a security server (e.g., security server 140) for securing device attestation and mutual authentication of multiple devices used in conjunction within the AR environment, in accordance with techniques described in this disclosure.

In this example, security server 140 may receive device attestation request (702). The device attestation request includes one or more device certificates of peripheral device 136 and HMD 112. In some examples, the one or more device certificates of HMD 112 are encrypted with a public key. In some examples, security server 140 may receive, from peripheral device 136, the device attestation request that is encrypted with a session key (e.g., second session key ($S_{k2}$) to securely communicate between peripheral device 136 and security server 140.

Security server 140 may decrypt the device attestation request. For example, when security server 140 receives the encrypted device attestation request, security server 140 decrypts the encrypted device attestation request with the second session key ($S_{k2}$) used to securely communicate between peripheral device 136 and security server 140. Security server 140 also decrypts the encrypted HMD device certificates with a private key.

Security server 140 may generate pairing certificate (704). For example, security server 140 verifies the peripheral device certificates and the HMD device certificates and generates a pairing certificate for the device attestation request. The pairing certificate includes information specifying the device certificates of SoCs of peripheral device 136 and one or more device certificates of SoCs of HMD 112 that are permitted for pairing. In some examples, security server 140 may generate the pairing certificate based on one or more policies that control the permitted relationship between the devices. For example, the policies may include a one-to-one pairing relationship, a one-to-many pairing relationship, a many-to-one pairing relationship, and/or many-to-many pairing relationship. In some examples, security server 140 maintains a directory that stores pairing certificates. Prior to generating a pairing certificate, security server 140 may refer to the directory to determine whether generating a new pairing certificate would violate the one or more policies.

In response to generating the pairing certificate, security server 140 communicates the encrypted pairing certificate to peripheral device 136 (706). In this way, peripheral device 136 and HMD 112 may each store the pairing certificate in a non-volatile memory. In some examples, security server 140 may encrypt pairing certificate. For example, prior to sending the pairing certificate to peripheral device 136, security server 140 may encrypt the pairing certificate with the second session key ($S_{k2}$) used to securely communicate between security server 140 and peripheral device 136. In some examples, security server 140 may digitally sign (referred to as "digital signature") the pairing certificate by encrypting a hash of the pairing certificate with private key. In these examples, peripheral device 136 uses the public key to validate the authenticity and integrity of the pairing certificate (e.g., that the pairing certificate has not been tampered with).

Figure 8:
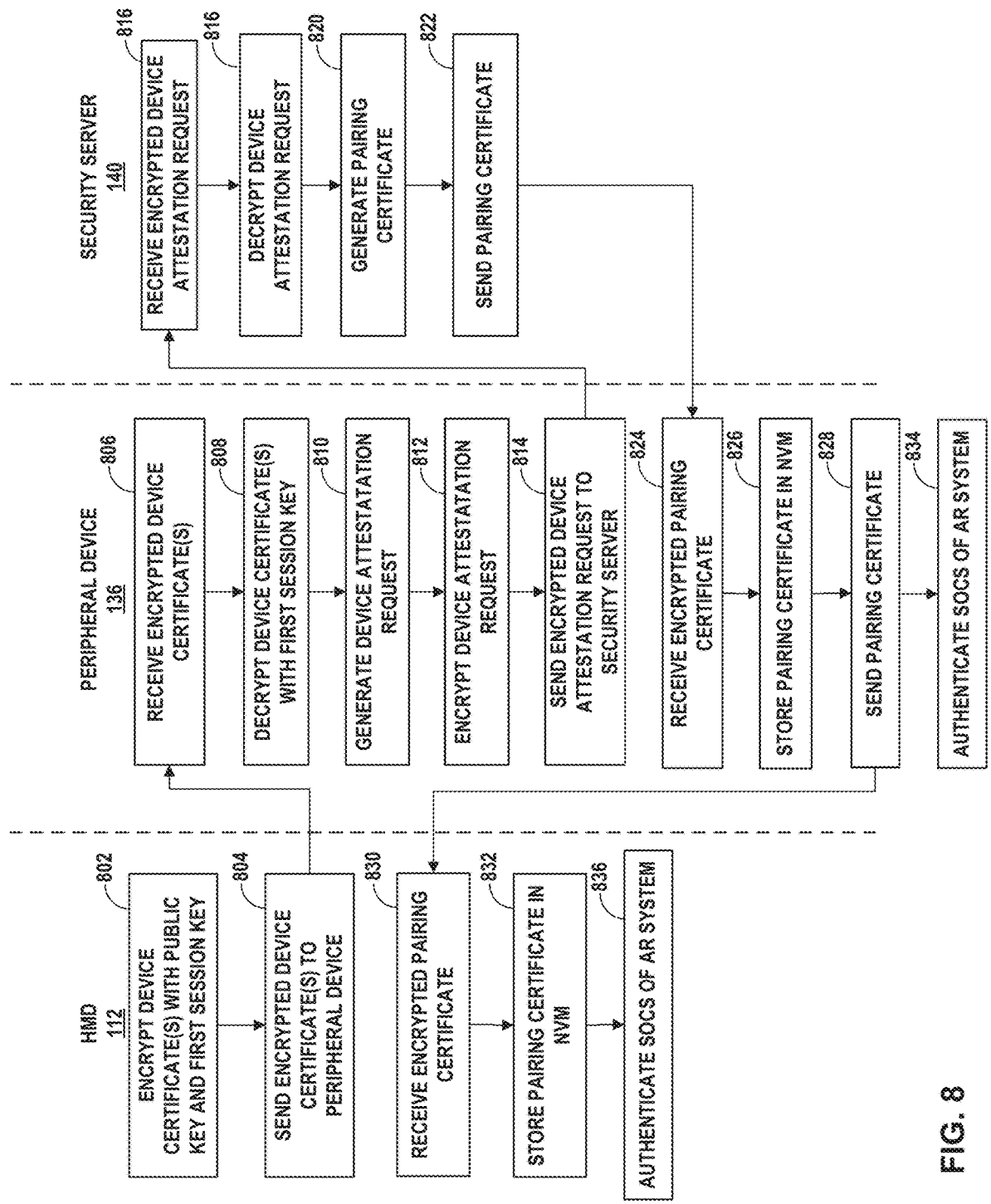
FIG. 8 is a flowchart illustrating an example operation to securely communicate device certificates for device attestation and mutual authentication, in accordance with techniques described in this disclosure.

FIG. 8 is a flowchart illustrating an example operation to securely communicate device certificates for device attestation and mutual authentication, in accordance with techniques described in this disclosure. In this example, peripheral device 136 initiates pairing with one or more HMDs, e.g., HMD 112. Upon initial pairing, HMD 112 sends one or more device certificates of SoCs of HMD 112 for device attestation. HMD 112 encrypts the device certificates of the SoCs with a public key, e.g., server public key 608 of FIG. 6, and the first session key $S_{k1}$ (802). For example, peripheral device 136 and HMD 112 negotiates a first session key (e.g., $S_{k1}$) to securely communicate between peripheral device 136 and HMD 112. In some examples, HMD 112 may sign device certificates (e.g., device certificates 606 of FIG. 5B) of SoCs with a private key, e.g., private key 610A of FIG. 6. For example, HMD 112 may hash the HMD device certificates with the private key, which peripheral device 136 verifies with a public key.

HMD 112 sends the encrypted device certificates to the peripheral device 136 (804). In some examples, HMD 112 sends the encrypted device certificates with a nonce (e.g., n1) that is a random or pseudo-random number used to prevent old communications being reused in replay attacks.

Peripheral device 136 receives the encrypted device certificates (806) and decrypts the device certificates of HMD 112 using the first session key $S_{k1}$ (808). In some examples in which HMD 112 sends the encrypted device certificates with a nonce n1, the peripheral device 136 sends a hash of the nonce n1 as acknowledgement in response to receiving the encrypted device certificates.

Peripheral device 136 generates a device attestation request including one or more device certificates of peripheral device 136 and the device certificates of HMD 112 that are encrypted with the public key (810). Peripheral device 136 encrypts the device attestation request using the second session key $S_{k2}$ (812). For example, peripheral device 136 and security server 140 negotiates a second session key (e.g., $S_{k2}$) to securely communicate between peripheral device 136 and security server 140. Peripheral device 136 sends the encrypted device attestation request to security server 140 (814).

Security server 140 receives the encrypted device attestation request (816) and decrypts the device attestation request (816). For example, security server 140 decrypts the device certificates of peripheral device 136 using the second session key $S_{k2}$. Security server 140 also decrypts the device certificates of HMD 112 using the private key.

Peripheral device 136 generates a pairing certificate that includes information specifying the particular devices permitted for pairing (820). In particular, security server 140 generates a pairing certificate to include and precisely specify one or more device certificates of SoCs that are permitted for pairing in the AR environment.

In some examples, security server 140 determines whether the device certificates of peripheral device 136 and HMD 112 may be paired before generating the pairing certificate. For example, security server 140 generates a pairing certificate based on policies that control the permitted relationship between the devices, such as whether the peripheral device is only permitted to have a one-to-one pairing relationship, a one-to-many pairing relationship, many-to-one pairing relationship, or a many-to-many pairing relationship. In some examples, security server 140 maintains a directory of pairing certificates and, prior to generating a new pairing certificate, refers to the directory to determine whether the new pairing would violate the policies.

In response to generating the pairing certificate, security server 140 sends the pairing certificate to peripheral device 136 (822). In some examples, security server 140 encrypts the pairing certificate with the second session key $S_{k2}$. In some examples, security server 140 digitally signs the pairing certificate with the private key. For example, security server 140 encrypts a hash of the pairing certificate with the private key.

In response to receiving the pairing certificate (824), peripheral device 136 decrypts the pairing certificate using the second session key $S_{k2}$. In some examples in which security server 140 digitally signs the pairing certificate, peripheral device 136 verifies the digital signature with the public key to determine whether the pairing certificate that was received was the pairing certificate sent by security server 140. Peripheral device 136 stores the pairing certificate in non-volatile memory (826). In some examples, peripheral device 136 encrypts the pairing certificate with a public key of an SoC prior to storing the pairing certificate.

Peripheral device 136 sends the pairing certificate to HMD 112 (828). In some examples, peripheral device 136 encrypts the pairing certificate with the first session key $S_{k1}$ before sending the pairing certificate to HMD 112. In some examples, peripheral device 136 sends the encrypted pairing certificate with a nonce (e.g., n2) to indicate pairing was successful. Nonce hashing-based handshaking ensures that peripheral device 136 and HMD 112 commit NVM writes only after authentication success. In this way, NVM write cycles are not misused with malicious abandoned pairings.

In response to receiving the pairing certificate (830), HMD 112 decrypts the encrypted pairing certificate using the first session key $S_{k1}$. HMD 112 stores the pairing certificate in non-volatile memory (832). In some examples, HMD 112 encrypts the pairing certificate with a public key of an SoC prior to storing the pairing certificate.

In some examples, peripheral device 136 sends a hash of the pairing certificate to security server 140. In response, security server 140 compares the hash signature, and updates the new pairing certificate in its directory.

When peripheral device 136 and HMD 112 are powered on and performs a secure boot, each of the devices may mutually authenticate the SoCs of the devices based on the pairing certificate stored in the NVM of each device. For example, a security processor of peripheral device 136 may have exclusive access to the pairing certificate stored in the NVM and use the pairing certificate. The security processor of peripheral device 136 determines whether the pairing certificate specifies device certificates of SoCs of HMD 112 based on the device certificates within the pairing certificate (834). Similarly, a security processor of HMD 112 may use the pairing certificate stored in the NVM of HMD 112 and determines whether the pairing certificate specifies device certificates of SoCs of peripheral device 136 based on the device certificates within the pairing certificate (836).

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD- ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

What is claimed is:

1. An artificial reality system comprising:
a security server comprising processing circuitry and configured to generate a pairing certificate that includes information identifying a plurality of devices to be operationally paired with each other within the artificial reality system;
a peripheral device of the plurality of devices comprising processing circuitry and configured to receive one or more inputs from a user of the artificial reality system, wherein the peripheral device is configured to store the pairing certificate in a non-volatile memory of the peripheral device for authenticating the peripheral device and a head-mounted display (HMD) of the plurality of devices for pairing; and
the HMD comprising processing circuitry and configured to output artificial reality content, wherein the HMD is configured to store the pairing certificate in a non-volatile memory of the HMD for authenticating the HMD device and the peripheral device for pairing.

2. The artificial reality system of claim 1,
wherein each of the peripheral device and the HMD comprises one or more System on a Chip (SoC) integrated circuits, and
wherein the pairing certificate comprises identifiers for each of the one or more SoC integrated circuits of the peripheral device and the one or more SoC integrated circuits of the HMD.

3. The artificial reality system of claim 2,
wherein the security server is configured to generate the pairing certificate in response to receiving a device attestation request that includes one or more device-specific digital certificates for each of the one or more SoC integrated circuits of the peripheral device and one or more encrypted device-specific digital certificates for each of the one or more SoC integrated circuits of the HMD.

4. The artificial reality system of claim 3,
wherein the HMD is configured to encrypt the one or more device certificates of the one or more SoC integrated circuits of the HMD with a public key of the security server and a session key used for secure communication between the HMD and the peripheral device.

5. The artificial reality system of claim 3,
wherein the peripheral device is configured to generate the device attestation request, and
wherein the peripheral device is configured to encrypt the device attestation request with a session key used for secure communication between the peripheral device and the security server.

6. The artificial reality system of claim 2, wherein the one or more SoC integrated circuits of the peripheral device and the one or more SoC integrated circuits of the HMD comprises at least one of a co-application processor, sensor aggregator, and display.

7. The artificial reality system of claim 2,
wherein at least one of the one or more SoC integrated circuits of the peripheral device is configured as a gatekeeper device with writable access to the non-volatile memory of the peripheral device, and
wherein at least one of the one or more SoC integrated circuits of the HMD is configured as a gatekeeper device with writable access to the non-volatile memory of the HMD.

8. The artificial reality system of claim 1,
wherein the security server further comprises one or more pairing policies, and
wherein the security server is configured to generate the pairing certificate based on the one or more pairing policies.

9. The artificial reality system of claim 8, wherein the one or more pairing policies comprises at least one of a one-to-one pairing relationship, a one-to-many pairing relationship, a many-to-one pairing relationship, and a many-to-many pairing relationship.

10. The artificial reality system of claim 1,
wherein the security server further comprises a directory of previous pairing certificates, and
wherein the security server is configured to generate the pairing certificate based on the directory of previous pairing certificates.

11. A method comprising:
receiving, by a device of a plurality of devices of an artificial reality system, a pairing certificate that includes information specifying the device and one or more other devices of the plurality of devices, wherein the plurality of devices comprises a peripheral device configured to receive one or more inputs from a user of the artificial reality system and a head-mounted display (HMD) configured to output artificial reality content;
storing, by the device, the pairing certificate in a non-volatile memory of the device; and
authenticating, by the device and based on the pairing certificate, one or more other devices of the plurality of devices for operationally pairing with the device.

12. The method of claim 11,
wherein each of the plurality of devices comprises one or more System on a Chip (SoC) integrated circuits,
wherein the pairing certificate comprises identifiers for each of the one or more SoC integrated circuits of the plurality of devices,
wherein authenticating the one or more other devices comprises authenticating each of the SoC integrated circuits within the one or more other device based on the identifiers within the pairing certificate.

13. The method of claim 12, wherein the device is the HMD, the method further comprising:
   encrypting, by the HMD, one or more device certificates of the one or more SoC integrated circuits of the HMD with a public key of the security server; and
   encrypting, by the HMD and in response to encrypting the one or more device certificates, the encrypted one or more device certificates with a session key used for secure communicate between the HMD and the peripheral device.

14. The method of claim 12, wherein the device is the peripheral device, the method further comprising:
   receiving, by the peripheral device and from the HMD, one or more encrypted device certificates of the one or more SoC integrated circuits of the HMD;
   decrypting, by the peripheral device and using a first session key used for secure communication between the HMD and the peripheral device, the one or more encrypted device certificates of the one or more SoC integrated circuits of the HMD;
   generating, by the peripheral device, a device attestation request comprising one or more device certificates of the one or more SoC integrated circuits of the peripheral device and one or more encrypted device certificates of the one or more SoC integrated circuits of the HMD; and
   encrypting, by the peripheral device, the device attestation request with a second session key used for secure communication between the peripheral device and a security server of the artificial reality system; and
   sending, by the peripheral device, the encrypted device attestation request to the security server.

15. The method of claim 11, further comprising:
   receiving, by a security server of the artificial reality system, a device attestation request for pairing the peripheral device and the HMD;
   generating, by the security server, the pairing certificate that includes information specifying the peripheral device and the HMD; and
   sending, by the security server, the pairing certificate toward the peripheral device and the HMD.

16. The method of claim 15, further comprising:
   decrypting, by the security server and based on a session key used for secure communication between the peripheral device and the security server, the device attestation request to obtain the one or more device certificates of the one or more SoC integrated circuits of the peripheral device and one or more encrypted device certificates of the one or more SoC integrated circuits of the HMD; and
   decrypting, by the security server and in response to decrypting the device attestation request, the one or more encrypted device certificates of one or more SoC integrated circuits of the HMD based on a public key of the security server.

17. The method of claim 15, wherein generating the pairing certificate comprises:
   generating the pairing certificate based on one or more pairing policies.

18. The method of claim 17, wherein the one or more pairing policies comprises at least one of a one-to-one pairing relationship, a one-to-many pairing relationship, a many-to-one pairing relationship, and a many-to-many pairing relationship.

19. The method of claim 18, wherein generating the pairing certificate comprises:
   generating the pairing certificate based on a directory of previous pairing certificates.

20. A non-transitory, computer-readable medium comprising instructions that, when executed, cause processing circuitry of a security server of an artificial reality system including a head-mounted display (HMD) comprising processing circuitry and configured to output artificial reality content and a peripheral device comprising processing circuitry and configured to receive one or more inputs from a user of the artificial reality system, to:
   receive a device attestation request for pairing the peripheral device with the HMD;
   generate a pairing certificate that includes information specifying the peripheral device and the HMD to be paired; and
   send the pairing certificate toward the peripheral device and the HMD for storage in a non-volatile memory of the peripheral device and a non-volatile memory of the HMD.

* * * * *